(12) United States Patent
Yu et al.

(10) Patent No.: US 10,645,724 B2
(45) Date of Patent: May 5, 2020

(54) PARALLEL DATA TRANSMISSION METHOD AND APPARATUS

(71) Applicant: Huawei Technologies Co., Ltd., Shenzhen, Guangdong (CN)

(72) Inventors: Jian Yu, Shenzhen (CN); Meilu Lin, Shenzhen (CN); Xun Yang, Shenzhen (CN); Yuchen Guo, Shenzhen (CN)

(73) Assignee: HUAWEI TECHNOLOGIES CO., LTD, Shenzhen, Guangdong (CN)

( * ) Notice: Subject to any disclaimer, the term of this patent is extended or adjusted under 35 U.S.C. 154(b) by 0 days.

(21) Appl. No.: 16/001,713

(22) Filed: Jun. 6, 2018

(65) Prior Publication Data

US 2018/0288800 A1    Oct. 4, 2018

Related U.S. Application Data

(63) Continuation of application No. PCT/CN2016/091784, filed on Jul. 26, 2016.

(30) Foreign Application Priority Data

Dec. 7, 2015    (CN) .......................... 2015 1 0896649

(51) Int. Cl.
*H04W 74/08* (2009.01)
*H04W 76/15* (2018.01)
(Continued)

(52) U.S. Cl.
CPC ....... *H04W 74/0808* (2013.01); *H04W 74/00* (2013.01); *H04W 74/002* (2013.01); *H04W 76/15* (2018.02); *H04W 84/12* (2013.01)

(58) Field of Classification Search
CPC . H04W 74/0808; H04W 76/15; H04W 74/00; H04W 74/002
See application file for complete search history.

(56) References Cited

U.S. PATENT DOCUMENTS

2011/0103325 A1    5/2011  Cho et al.
2014/0086227 A1    3/2014  Yang et al.
(Continued)

FOREIGN PATENT DOCUMENTS

CN    102577527 A    7/2012
CN    102843785 A    12/2012
(Continued)

OTHER PUBLICATIONS

IEEE 802.11-15/1104r4 Reza Hedayat et al.,"TXOP Considerations for Spatial Reuse",Reza Hedayat,dated Sep. 12, 2015,total 18 pages.
(Continued)

*Primary Examiner* — Ronald B Abelson
(74) *Attorney, Agent, or Firm* — Womble Bond Dickinson (US) LLP

(57) ABSTRACT

Methods and apparatuses of parallel data transmission are disclosed. In one embodiment, a first node generates a physical protocol data unit (PPDU) that carries indication information. The indication information is used to indicate whether a second node is allowed to perform parallel data transmission by spanning a time length of the PPDU and indicate a boundary crossing time length of the parallel data transmission. The first node is included in a first basic set service (BSS), and the second node is included in a second BSS. The first node sends the PPDU.

12 Claims, 10 Drawing Sheets

(51) Int. Cl.
*H04W 74/00* (2009.01)
*H04W 84/12* (2009.01)

(56) References Cited

U.S. PATENT DOCUMENTS

| 2015/0016325 | A1 | 1/2015 | Yang et al. | |
|---|---|---|---|---|
| 2015/0023335 | A1 | 1/2015 | Vermani et al. | |
| 2015/0201434 | A1 | 7/2015 | Fang et al. | |
| 2017/0070962 | A1* | 3/2017 | Wang | H04W 52/24 |
| 2017/0366307 | A1* | 12/2017 | Xing | H04L 1/1887 |

FOREIGN PATENT DOCUMENTS

| CN | 103298079 A | 9/2013 |
|---|---|---|
| CN | 105101435 A | 11/2015 |
| CN | 105120520 A | 12/2015 |
| WO | 2015112780 A1 | 7/2015 |

OTHER PUBLICATIONS

Jiayin Zhang (Huawei):"HE-SIG-A Content;11-15-1077-00-00ax-he-sig-a-content", vol. 80211 ax, Sep. 14, 2015, pp. 1-21, XP068098290.
Yongho Seok (LG Electronics):"CC9-cluase-9-19-4a-2-comment-resolution;11-13, 0777-01-00ah-cc9-cluase-9-19-4a-2-comment-resolution", vol. 802.11 ah, No. 1, Jul. 16, 2013, pp. 1-4, XP068054388.

* cited by examiner

PARALLEL DATA TRANSMISSION METHOD AND APPARATUS

CROSS-REFERENCE TO RELATED APPLICATIONS

This application is a continuation of International Application No. PCT/CN2016/091784, filed on Jul. 26, 2016, which claims priority to Chinese Patent Application No. 201510896649.0, filed on Dec. 7, 2015, the disclosures of which are incorporated herein by reference.

TECHNICAL FIELD

Embodiments of the disclosure relate to the field of communications technologies, and in particular, to a parallel data transmission method and apparatus.

BACKGROUND

A wireless network may include a plurality of basic service sets (BSS). A carrier sense multiple access with collision avoidance (CSMA/CA) mechanism in an 802.11 standard is usually used to ensure that access points (AP) and stations (STA) in different BSSs can access a wireless medium, and no conflict occurs between all nodes.

However, when a physical protocol data unit (PPDU) is transmitted on a border between two BSSs based on the CSMA/CA mechanism, usually APs/STAs in only one cell can transmit data, but APs/STAs in another cell cannot transmit data. Consequently, resources cannot be fully used.

In this case, a spatial-reuse parallel transmission concept is proposed in a new 802.11ax standard. For example, as shown in FIG. 1, when a PPDU is transmitted between an AP 1 and a STA 1 on a link 1 in a BBS 1, an AP 2 in a BSS 2 may determine, based on an obtained spatial reuse parameter such as Transmission Power Control (TPC) information, whether data transmission on a link 2 established between the AP 2 and a STA 2 in the BSS 2 causes interference to the link 1 between the AP 1 and the STA 1. If the AP 2 determines that the data transmission causes no interference to the link 1, the AP 2 may continue to transmit data after the PPDU transmission between the AP 1 and the STA 1 ends. To be specific, the AP 2 may transmit data across a boundary of the PPDU.

However, after the PPDU transmission between the AP 1 and the STA 1 ends, the AP 1 may further interact with another AP/STA. For example, when the AP 1 subsequently establishes a link 3 to interact with a STA 3 in an overlapped basic service set (OBSS), the link 2 between the AP 2 and the STA 2 causes interference to data transmission on the link 3.

SUMMARY

Embodiments of the present disclosure provide a parallel data transmission method and apparatus, to reduce link interference brought by parallel transmission across a boundary of the PPDU.

To achieve the foregoing objectives, the following technical solutions are used in the embodiments of the present disclosure:

According to a first aspect, an embodiment of the present disclosure provides a parallel data transmission method, including: generating, by a first node, a PPDU, where the PPDU carries indication information, the indication information is used to indicate whether a second node is allowed to perform parallel data transmission by spanning a time length of the PPDU and indicate a boundary crossing time length of the parallel data transmission, the first node belongs to a first BSS, and the second node belongs to a second BSS; and sending, by the first node, the PPDU.

It may be learned that, according to the parallel data transmission method provided in this embodiment of the present disclosure, when transmitting the PPDU, the first node indicates, to the second node, whether the second node is allowed to perform parallel data transmission by spanning the time length of the PPDU, and indicates the boundary crossing time length of the parallel data transmission. Therefore, the second node may determine, based on the indication information, whether to perform parallel transmission across a boundary of the PPDU, and determine a boundary crossing time length of the parallel transmission, to avoid a problem that because a primary link of the first node changes, parallel transmission on a secondary link of the second node causes interference to data transmission on a changed primary link. In other words, link interference brought by parallel transmission across the boundary of the PPDU can be reduced.

In one embodiment, if the first node is an access point AP in the first BSS, the sending, by the first node, the PPDU includes: sending, by the AP, the PPDU to a station in the first BSS, where a high efficiency signal field or a MAC frame of the PPDU carries the indication information.

In another embodiment, in the indication information, two bits are used to indicate whether the second node is allowed to perform parallel data transmission by spanning the time length of the PPDU and indicate the boundary crossing time length of the parallel data transmission; or in the indication information, one bit is used to indicate whether the second node is allowed to perform parallel data transmission by spanning the time length of the PPDU; and if the second node is allowed to perform parallel data transmission by spanning the time length of the PPDU, two bits are used to indicate the boundary crossing time length of the parallel data transmission in the indication information.

In yet another embodiment, in the indication information, M bits are respectively used to indicate whether the second node is allowed to perform parallel data transmission in M time periods in a transmission opportunity (TXOP) time length, where M≥1; or in the indication information, N bits are respectively used to indicate whether the second node is allowed to perform parallel data transmission in N time lengths of the PPDU, where N≥1.

In still another embodiment, if the first node is a station in the first BSS, the generating, by a first node, a PPDU includes: receiving, by the station, indication information sent by an AP in the first BSS, where the indication information is used to indicate whether the second node is allowed to perform parallel data transmission by spanning the time length of the PPDU and indicate the boundary crossing time length of the parallel data transmission; and generating, by the station, a PPDU, where the PPDU carries the indication information.

In another embodiment, if the first node is a station in the first BSS, the generating, by a first node, a PPDU includes: receiving, by the station, an indication parameter sent by an AP in the first BSS, where the indication parameter is used to indicate whether the AP allows the second node to perform parallel data transmission by spanning the time length of the PPDU and indicate the boundary crossing time length of the parallel data transmission; generating, by the station, indication information based on the time length of the PPDU, a TXOP time length, and the indication parameter, where the indication information is used to indicate whether the station allows the second node to perform parallel data transmission by spanning the time length of the PPDU and indicate the boundary crossing time length of the parallel data transmission; and generating, by the station, a PPDU, where the PPDU carries the indication information.

According to a second aspect, an embodiment of the present disclosure provides a parallel data transmission method, including: obtaining, by a second node, a PPDU sent by a first node, where the PPDU carries indication information, the indication information is used to indicate whether the second node is allowed to perform parallel data transmission by spanning a time length of the PPDU and indicate a boundary crossing time length of the parallel data transmission, the first node belongs to a first basic service set BSS, and the second node belongs to a second BSS; and if the first node indicates that the second node is not allowed to perform parallel data transmission by spanning the time length of the PPDU, performing, by the second node, parallel data transmission in the time length of the PPDU; or if the first node indicates that the second node is allowed to perform parallel data transmission by spanning the time length of the PPDU, performing, by the second node, parallel data transmission in the boundary crossing time length.

In one embodiment, the first node is an AP or a station in the first BSS; and the obtaining, by a second node, a PPDU sent by a first node includes: obtaining, by the second node, a PPDU sent by the AP, where the PPDU sent by the AP carries first indication information, the first indication information is used to indicate whether the AP allows the second node to perform parallel data transmission by spanning a time length of the PPDU and indicate a boundary crossing time length of the parallel data transmission; or obtaining, by the second node, a PPDU sent by the station, where the PPDU sent by the station carries second indication information, the second indication information is used to indicate whether the station allows the second node to perform parallel data transmission by spanning a time length of the PPDU and indicate a boundary crossing time length of the parallel data transmission; and selecting, by the second node, the first indication information or the second indication information as the indication information; or using, by the second node, the first indication information as the indication information.

In another embodiment, the selecting, by the second node, the first indication information or the second indication information as the indication information includes: comparing, by the second node, the boundary crossing time length indicated by the first indication information with the boundary crossing time length indicated by the second indication information; and using, by the second node, the first indication information or the second indication information with a shorter boundary crossing time length as the indication information.

In conclusion, this embodiment of the present disclosure provides the parallel data transmission method. The first node in the first BSS generates the PPDU. The PPDU carries the indication information. The indication information is used to indicate whether the second node in the second BSS is allowed to perform parallel data transmission by spanning the time length of the PPDU and indicate the boundary crossing time length of the parallel data transmission. The first node belongs to the first basic service set BSS, and the second node belongs to the second BSS. Further, the first node sends the PPDU, so that the second node can determine, based on the indication information, whether to perform parallel transmission across a boundary of the PPDU, and determine a boundary crossing time length of the parallel transmission. Therefore, the problem where a primary link changes and parallel transmission on a secondary link causes interference to data transmission on the changed primary link is avoided. In other words, link interference brought by parallel transmission across the boundary of the PPDU can be reduced.

According to a third aspect, after the second node obtains the indication information carried in the PPDU, the second node may perform channel contention based on a backoff mechanism, so as to perform parallel data transmission on a channel obtained through contention. In this case, based on the problem of how to perform channel contention based on the backoff mechanism, this embodiment of the present disclosure provides a parallel data transmission method, including: determining, by a second node, whether a parallel data transmission condition is met; if the parallel data transmission condition is met, determining, by the second node, a count value of a first backoff counter, a transmission time length required for a to-be-transmitted PPDU, and a remaining time length obtained before a boundary crossing time length ends; and determining, by the second node, a channel contention scheme based on the count value of the first backoff counter, the transmission time length required for the to-be-transmitted PPDU, and the remaining time length obtained before the boundary crossing time length ends, so that the second node performs parallel transmission of the to-be-transmitted PPDU on a channel obtained through contention.

This way, based on the count value, the transmission time length, and the remaining time length, the second node may determine different channel contention schemes in different application scenarios, so that the second node performs parallel transmission of the to-be-transmitted PPDU on the channel obtained through contention.

In one embodiment, the determining, by the second node, a channel contention scheme based on the count value of the first backoff counter, the transmission time length, and the remaining time length includes: starting, by the second node, to perform backoff from the count value by using the first backoff counter; and when the first backoff counter falls back to 0, if the remaining time length is less than the transmission time length, determining, by the second node, that the channel contention scheme is to perform channel contention again after the boundary crossing time length ends, or immediately perform channel contention again.

In another embodiment, the channel contention scheme further includes: resetting, by the second node, a size of a first backoff window, maintaining the size of the first backoff window, or doubling the size of the first backoff window, so that the second node resets the count value of the first backoff counter based on the size of the first backoff window.

In yet another embodiment, the determining, by the second node, a channel contention scheme based on the count value of the first backoff counter, the transmission time length, and the remaining time length includes: starting, by the second node, to perform backoff from the count value by using the first backoff counter; and when the first backoff counter falls back to 0, if the remaining time length is not less than the transmission time length, determining, by the second node, that the channel contention scheme is to perform parallel transmission of the to-be-transmitted PPDU immediately.

In still another embodiment, the channel contention scheme further includes: performing, by the second node, channel contention again after the boundary crossing time length ends; or immediately performing, by the second node, channel contention again.

In another embodiment, the channel contention scheme further includes: resetting, by the second node, a size of a first backoff window, so that the second node updates the count value of the first backoff counter based on the size of the first backoff window.

In yet another embodiment, the determining, by the second node, a channel contention scheme based on the count value of the first backoff counter, the transmission time length, and the remaining time length includes: determining, by the second node through calculation based on the count value, whether the first backoff counter can fall back to 0 and the to-be-transmitted PPDU can be sent in the remaining time length; and if the first backoff counter cannot fall back to 0 and the to-be-transmitted PPDU cannot be sent in the boundary crossing time length, determining, by the second node, that the channel contention scheme is to suspend the first backoff counter, and continue to perform channel contention by using the first backoff counter after the boundary crossing time length ends.

In still another embodiment, after the determining, by a second node, whether a parallel data transmission condition is met, the method further includes: if the parallel data transmission condition is met, suspending, by the second node, a second backoff counter, where the channel contention scheme includes: after the boundary crossing time length ends, if it is detected that the channel is in an idle state, resuming, by the second node, the second backoff counter, and performing channel contention by using the second backoff counter.

It may be learned that two backoff counters are used in the channel contention scheme, so that fairness is ensured when a transmit end on a primary link and a transmit end on a secondary link perform channel contention. Parallel transmission is used as an additional transmission opportunity of the second node on the secondary link, so that transmission efficiency is improved.

According to a fourth aspect, an embodiment of the present disclosure provides a first node, including: a generation unit, configured to generate a PPDU, where the PPDU carries indication information, the indication information is used to indicate whether a second node is allowed to perform parallel data transmission by spanning a time length of the PPDU and indicate a boundary crossing time length of the parallel data transmission, the first node belongs to a first basic service set BSS, and the second node belongs to a second BSS; and a sending unit, configured to send the PPDU.

In one embodiment, if the first node is an access point AP in the first BSS, the sending unit is specifically configured to send the PPDU to a station in the first BSS, where a high efficiency signal field or a media access control (MAC) frame of the PPDU carries the indication information.

In another embodiment, in the indication information, two bits are used to indicate whether the second node is allowed to perform parallel data transmission by spanning the time length of the PPDU and indicate the boundary crossing time length of the parallel data transmission; or in the indication information, one bit is used to indicate whether the second node is allowed to perform parallel data transmission by spanning the time length of the PPDU; and if the second node is allowed to perform parallel data transmission by spanning the time length of the PPDU, two bits are used to indicate the boundary crossing time length of the parallel data transmission in the indication information.

In yet another embodiment, in the indication information, M bits are respectively used to indicate whether the second node is allowed to perform parallel data transmission in M time periods in a transmission opportunity TXOP time length, where $M \geq 1$; or in the indication information, N bits are respectively used to indicate whether the second node is allowed to perform parallel data transmission in N time lengths of the PPDU, where $N \geq 1$.

In still another embodiment, if the first node is a station in the first BSS, the first node further includes a receiving unit, where the receiving unit is configured to receive indication information sent by an AP in the first BSS, the indication information is used to indicate whether the second node is allowed to perform parallel data transmission by spanning the time length of the PPDU and indicate the boundary crossing time length of the parallel data transmission; and the generation unit is specifically configured to generate a PPDU, where the PPDU carries the indication information.

In another embodiment, if the first node is a station in the first BSS, the first node further includes a receiving unit, where the receiving unit is configured to receive an indication parameter sent by an AP in the first BSS, where the indication parameter is used to indicate whether the AP allows the second node to perform parallel data transmission by spanning the time length of the PPDU and indicate the boundary crossing time length of the parallel data transmission; and the generation unit is specifically configured to: generate indication information based on the time length of the PPDU, a TXOP time length, and the indication parameter, where the indication information is used to indicate whether the station allows the second node to perform parallel data transmission by spanning the time length of the PPDU and indicate the boundary crossing time length of the parallel data transmission; and generate a PPDU, where the PPDU carries the indication information.

According to a fifth aspect, an embodiment of the present disclosure provides a second node, including: an obtaining unit, configured to obtain a PPDU sent by a first node, where the PPDU carries indication information, the indication information is used to indicate whether the second node is allowed to perform parallel data transmission by spanning a time length of the PPDU and indicate a boundary crossing time length of the parallel data transmission, the first node belongs to a first basic service set BSS, and the second node belongs to a second BSS; and a transmission unit, configured to: if the first node indicates that the second node is not allowed to perform parallel data transmission by spanning the time length of the PPDU, perform parallel data transmission in the time length of the PPDU; or if the first node indicates that the second node is allowed to perform parallel data transmission by spanning the time length of the PPDU, perform parallel data transmission in the boundary crossing time length.

In one embodiment, the first node is an AP or a station in the first BSS, and the second node further includes a selection unit, where the obtaining unit is specifically configured to obtain a PPDU sent by the AP, where the PPDU sent by the AP carries first indication information, the first indication information is used to indicate whether the AP allows the second node to perform parallel data transmission by spanning a time length of the PPDU and indicate a boundary crossing time length of the parallel data transmission; or obtain a PPDU sent by the station, where the PPDU sent by the station carries second indication information, the second indication information is used to indicate whether the station allows the second node to perform parallel data transmission by spanning a time length of the PPDU and indicate a boundary crossing time length of the parallel data transmission; and the selection unit is configured to select the first indication information or the second indication information as the indication information; or the second node uses the first indication information as the indication information.

In another embodiment, the selection unit is specifically configured to compare the boundary crossing time length indicated by the first indication information with the boundary crossing time length indicated by the second indication information; and use the first indication information or the second indication information with a shorter boundary crossing time length as the indication information.

According to a sixth aspect, an embodiment of the present disclosure provides a second node, including: a determining unit, configured to determine whether a parallel data transmission condition is met; and if the parallel data transmission condition is met, determine a count value of a first backoff counter, a transmission time length required for a to-be-transmitted PPDU, and a remaining time length obtained before a boundary crossing time length ends; and a contention unit, configured to determine a channel contention scheme based on the count value of the first backoff counter, the transmission time length required for the to-be-transmitted PPDU, and the remaining time length obtained before the boundary crossing time length ends, so that the second node performs parallel transmission of the to-be-transmitted PPDU on a channel obtained through contention.

In one embodiment, the second node further includes a backoff unit, where the backoff unit is configured to start to perform backoff from the count value by using the first backoff counter; and the contention unit is specifically configured to: when the first backoff counter falls back to 0, if the remaining time length is less than the transmission time length, determine that the channel contention scheme is to perform channel contention again after the boundary crossing time length ends, or immediately perform channel contention again.

In another embodiment, the contention unit is further configured to reset a size of a first backoff window, maintain the size of the first backoff window, or double the size of the first backoff window, so that the second node resets the count value of the first backoff counter based on the size of the first backoff window.

In yet another embodiment, the second node further includes a backoff unit, where the backoff unit is configured to start to perform backoff from the count value by using the first backoff counter; and the contention unit is specifically configured to: when the first backoff counter falls back to 0, if the remaining time length is not less than the transmission time length, determine that the channel contention scheme is to perform parallel transmission of the to-be-transmitted PPDU immediately.

In still another embodiment, the second node further includes a calculation unit, where the calculation unit is configured to determine, through calculation based on the count value, whether the first backoff counter can fall back to 0 and the to-be-transmitted PPDU can be sent in the remaining time length; and the contention unit is specifically configured to: if the first backoff counter cannot fall back to 0 and the to-be-transmitted PPDU cannot be sent in the boundary crossing time length, determine that the channel contention scheme is to suspend the first backoff counter, and continue to perform channel contention by using the first backoff counter after the boundary crossing time length ends.

In another embodiment, the second node further includes a second backoff counter, where the contention unit is specifically configured to: if the parallel data transmission condition is met, suspend the second backoff counter; and after the boundary crossing time length ends, if it is detected that the channel is in an idle state, resume the second backoff counter, and perform channel contention by using the second backoff counter.

According to a seventh aspect, an embodiment of the present disclosure provides a first node, including a processor, a memory, a bus, and a communications interface, where the memory is configured to store a computer executable instruction; the processor and the memory are connected by using the bus; and when the first node runs, the processor executes the computer executable instruction stored in the memory, so that the first node performs the parallel data transmission method in any one of the first aspect or the possible implementations of the first aspect.

According to an eighth aspect, an embodiment of the present disclosure provides a second node, including a processor, a memory, a bus, and a communications interface, where the memory is configured to store a computer executable instruction; the processor and the memory are connected by using the bus; and when the second node runs, the processor executes the computer executable instruction stored in the memory, so that the second node performs the parallel data transmission method in any one of the second aspect or the possible implementations of the second aspect, or any one of the third aspect or the possible implementations of the third aspect.

In conclusion, the embodiments of the present disclosure provide the first node and the second node. The first node in the first BSS generates the PPDU. The PPDU carries the indication information. The indication information is used to indicate whether the second node in the second BSS is allowed to perform parallel data transmission by spanning the time length of the PPDU and indicate the boundary crossing time length of the parallel data transmission. The first node belongs to the first basic service set BSS, and the second node belongs to the second BSS. Further, the first node sends the PPDU, so that the second node can determine, based on the indication information, whether to perform parallel transmission across a boundary of the PPDU, and determine a boundary crossing time length of the parallel transmission. Therefore, the problem where a primary link changes and parallel transmission on a secondary link causes interference to data transmission on the changed primary link is avoided. In other words, link interference brought by parallel transmission across the boundary of the PPDU can be reduced.

BRIEF DESCRIPTION OF DRAWINGS

To describe the technical solutions in the embodiments of the present disclosure or in the prior art more clearly, the following briefly describes the accompanying drawings required for describing the embodiments or the prior art.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure.

In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the present disclosure, "a plurality of" means two or at least two unless otherwise stated.

A parallel data transmission method provided in the embodiments of the present disclosure may be applied to a spatial reuse application scenario proposed in an 802.11ax standard.

Figure 1:
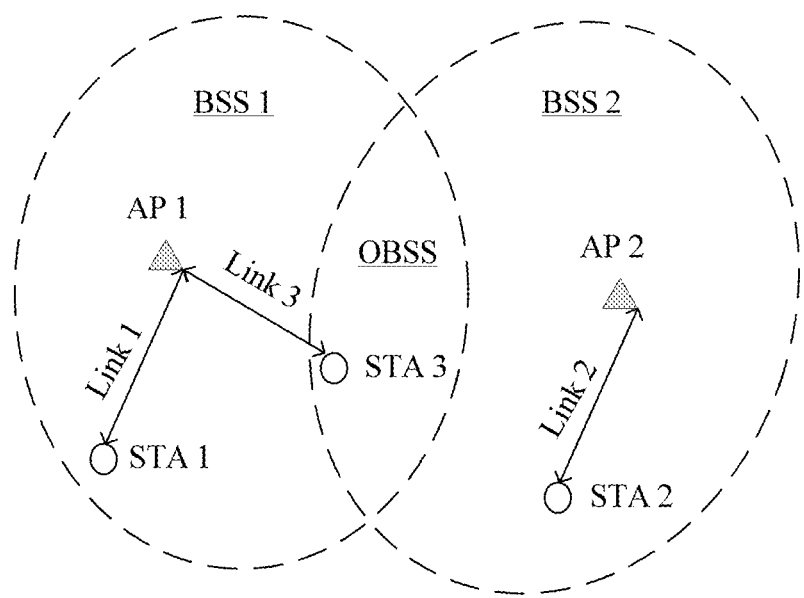
FIG. 1 is a schematic diagram of an application scenario of parallel data transmission in the prior art.
Figure 2:
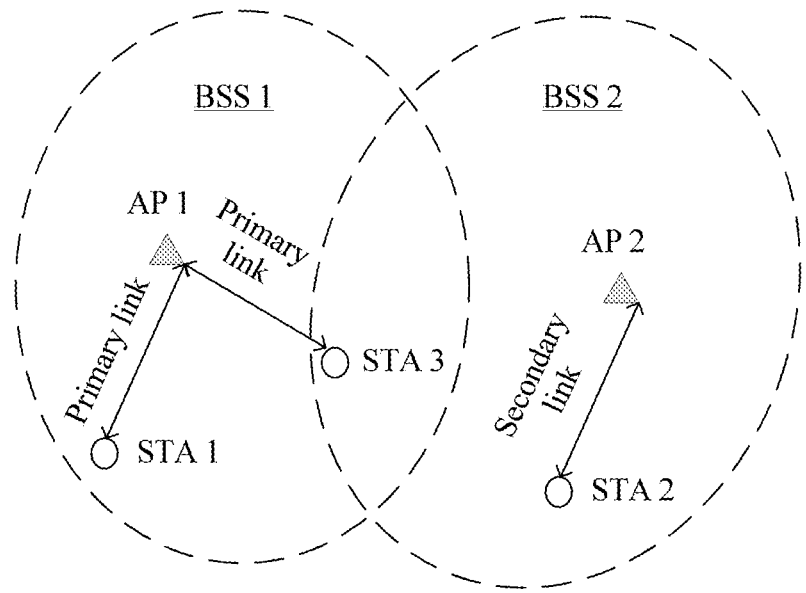
FIG. 2 is a schematic diagram of an application scenario of parallel data transmission according to an embodiment of the present disclosure.

For ease of describing invention details in the embodiments of the present disclosure, a spatial multiplexing parallel transmission concept is first described. As shown in FIG. 2, for example, a wireless network includes two BSSs. Before a spatial reuse concept is introduced, when a node in a BSS1 or a BSS2 needs to transmit data (for example, send a PPDU), the node determines, by using physical carrier sense and virtual carrier sense, whether a channel is idle. If the channel is idle, the node establishes a link and transmits data in the BSS by using a channel contention mechanism. If the channel is occupied, the node waits based on a backoff mechanism until the channel is idle, and then establishes a link and transmits data in the BSS by using a channel contention mechanism.

This way, it may be ensured that the channel is exclusive to a link in a BSS to some extent, and no collision occurs. However, a problem simultaneously occurs: On a border between two BSSs, because of an excessively conservative condition, usually nodes in only one BSS can transmit data, but nodes in another BSS cannot transmit data, resulting in relatively low system efficiency.

In this case, the spatial multiplexing parallel transmission concept is proposed in the 802.11ax standard. FIG. 2 is still used as an example. When an AP 1 in the BSS 1 establishes a primary link to a station 1 (STA 1) for PPDU transmission, if a parallel data transmission condition is met, for example, when an AP 2 receives a PPDU sent by the AP 1 and discovers that the PPDU is from an OBSS and that received signal strength is less than a threshold in a time period, a channel is considered as idle after physical carrier sense. In addition, if another station in the BSS 2 does not set a network allocation vector (NAV) for the AP 2, the channel is considered as idle after virtual carrier sense. If the channel is idle after both the physical carrier sense and the virtual carrier sense, the AP 2 in the BSS 2 may be allowed to establish a secondary link to a station 2 (STA 2) for PPDU transmission, so as to achieve a parallel transmission purpose and improve wireless network transmission efficiency.

However, during current parallel data transmission, a transmit end on the secondary link, for example, the AP 2 in the BSS 2, usually determines whether data transmission on the secondary link causes interference to the primary link between the AP 1 and the STA 1. If the AP 2 determines that the data transmission causes no interference to the primary link, the AP 2 may continue to transmit data after the PPDU transmission between the AP 1 and the STA 1 ends. To be specific, the AP 2 may transmit data across a boundary of a current PPDU. This way, a problem occurs: Once a transmit end on the primary link, for example, the AP 1 in the BSS 1, continues to re-establish a primary link to another node, for example, a STA 3, for data exchange after transmission of the current PPDU ends, because the primary link changes, parallel transmission on the secondary link probably causes interference to data transmission on the changed primary link.

It should be noted that, in the embodiments of the present disclosure, a link on which transmission is being performed in a BSS is referred to as the primary link, and a link on which parallel transmission is subsequently performed is referred to as the secondary link.

Figure 3:
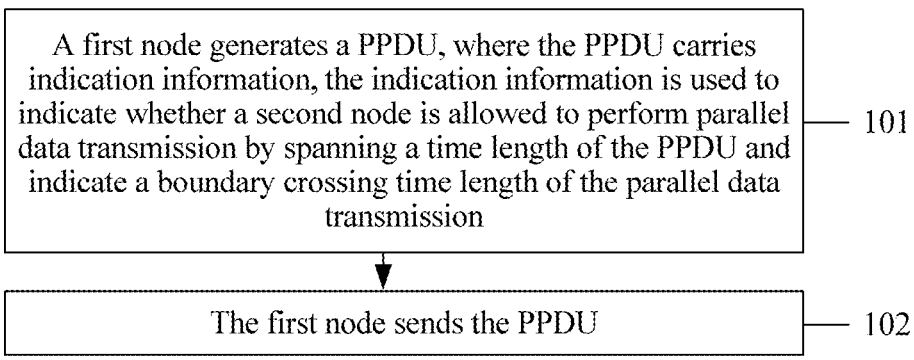
FIG. 3 is a flowchart 1 of a parallel data transmission method according to an embodiment of the present disclosure.

Therefore, an embodiment of the present disclosure provides a parallel data transmission method. As shown in FIG. 3, the method includes the following steps.

At 101, a first node generates a PPDU, where the PPDU carries indication information, the indication information is used to indicate whether a second node is allowed to perform parallel data transmission by spanning a time length of the PPDU and indicate a boundary crossing time length of the parallel data transmission.

The first node belongs to a first BSS, and the second node belongs to a second BSS.

In one embodiment, when the first node in the first BSS generates the PPDU, the PPDU carries the indication information indicating whether the second node in the second BSS is allowed to perform parallel data transmission by spanning the time length of the PPDU and indicating the boundary crossing time length of the parallel data transmission.

The boundary crossing time length is a time length in which the second node is allowed to perform parallel transmission. If the second node is not allowed to perform parallel data transmission by spanning the time length of the PPDU, the boundary crossing time length is the time length of the PPDU. In other words, the second node can perform parallel transmission only in a time length in which the first node transmits the PPDU. If the second node is allowed to perform parallel data transmission by spanning the time length of the PPDU, the boundary crossing time length may be any value less than a TXOP time length. For example, the boundary crossing time length may be two time lengths of the PPDU, or half the TXOP time length.

It should be noted that the first node in the first BSS may be an AP or a station. Subsequent embodiments separately describe the parallel data transmission method in this embodiment of the present disclosure by using an AP or a station as the first node. Details are not described herein. In addition, the second node in the second BSS may be an AP or a station.

At 102, the first node sends the PPDU.

For example, the first node may send, to a receive end on a primary link, the PPDU that carries the indication information. For example, when the first node is an AP 1 in FIG. 2, the AP may broadcast the PPDU to the receive end, namely, a station 1, on the primary link.

This way, the second node in the second BSS may obtain the indication information by obtaining the PPDU, so that the second node can determine, based on the indication information, whether the second node during parallel transmission on a secondary link can span the time length in which the first node on the primary link transmits the PPDU, and determine a boundary crossing time length of the parallel data transmission. If the second node is not allowed to perform parallel data transmission by spanning the time length of the PPDU, the second node performs parallel data transmission in the time length of the PPDU. If the second node is allowed to perform parallel data transmission by spanning the time length of the PPDU, the second node performs parallel data transmission in the boundary crossing time length.

It may be learned that, according to the parallel data transmission method provided in this embodiment of the present disclosure, when transmitting the PPDU, a transmit end on the primary link, namely, the first node, explicitly indicates, to a transmit end on the secondary link, namely, the second node, whether the second node is allowed to perform parallel data transmission by spanning the time length of the PPDU, and indicates the boundary crossing time length of the parallel data transmission. Therefore, the second node may determine, based on the indication information, whether to perform parallel transmission across a boundary of the PPDU, and determine a boundary crossing time length of the parallel transmission, to avoid a problem where the primary link changes and parallel transmission on the secondary link causes interference to data transmission on the changed primary link. In other words, link interference brought by parallel transmission across the boundary of the PPDU can be reduced.

Figure 4:
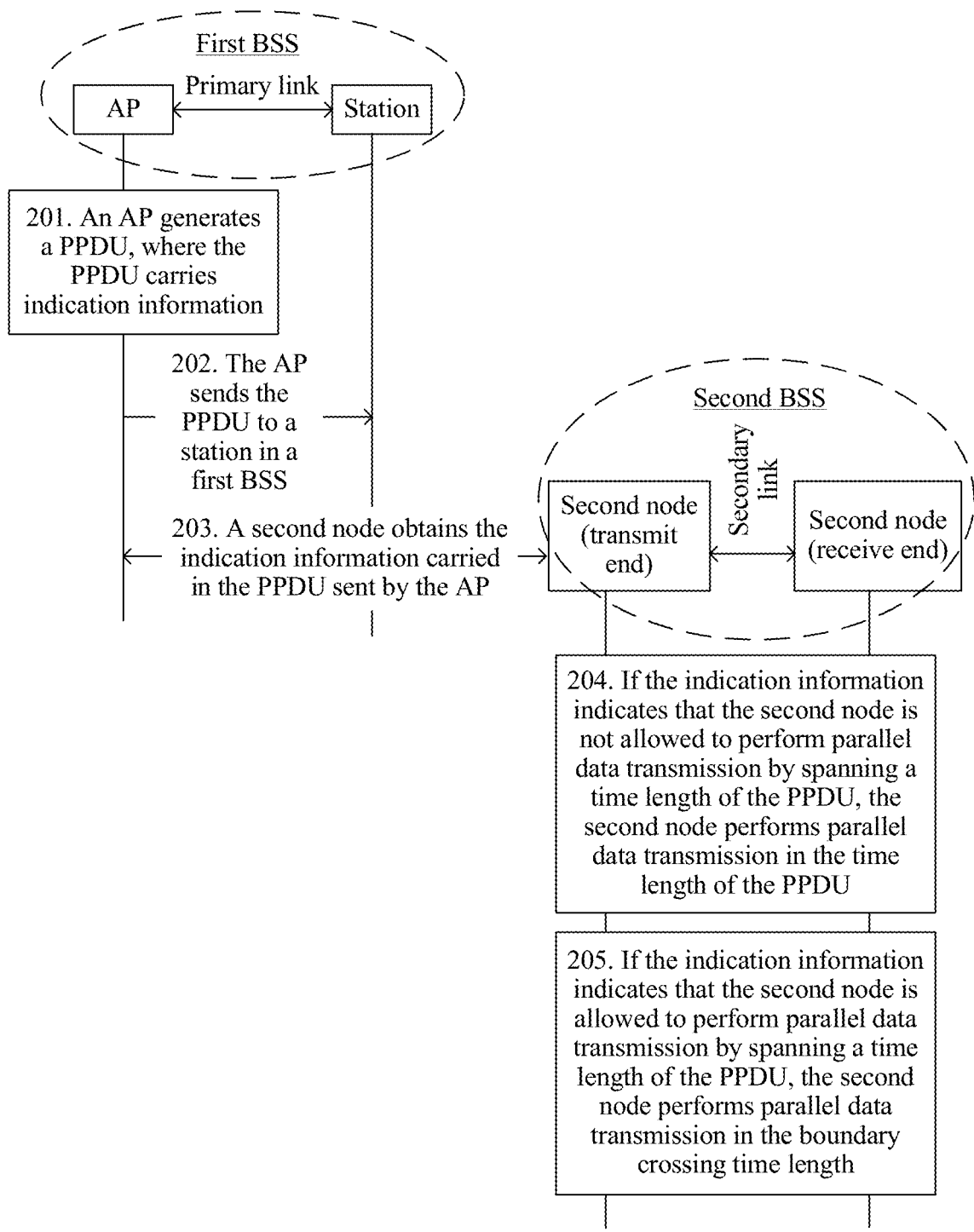
FIG. 4 is a diagram 1 of interaction of a parallel data transmission method according to an embodiment of the present disclosure.

An example in which a first node is an AP in a first BSS is used below to describe a parallel data transmission method according to an embodiment of the present disclosure. As shown in FIG. 4, the method includes the following steps:

At 201, an AP generates a PPDU, where the PPDU carries indication information, where the indication information is used to indicate whether a second node is allowed to perform parallel data transmission by spanning a time length of the PPDU and indicate a boundary crossing time length of the parallel data transmission.

At 202, the AP sends the PPDU to a station in a first BSS, where a high efficiency signal field or a MAC frame of the PPDU carries the indication information.

At 203, the second node obtains the indication information carried in the PPDU sent by the AP.

At 204, if the indication information indicates that the second node is not allowed to perform parallel data transmission by spanning the time length of the PPDU, where the second node performs parallel data transmission in the time length of the PPDU.

At 205, if the indication information indicates that the second node is allowed to perform parallel data transmission by spanning the time length of the PPDU, where the second node performs parallel data transmission in the boundary crossing time length.

In one embodiment, when a transmit end on a primary link is an AP in the first BSS, the AP generates the PPDU, where the PPDU carries the indication information, the indication information is used to indicate whether the second node is allowed to perform parallel data transmission by spanning the time length of the PPDU and indicate the boundary crossing time length of the parallel data transmission. For a method for generating the PPDU by the AP in the first BSS, refer to descriptions of block 101 in which the first node generates the PPDU. For brevity sake, details are not described herein again.

In one embodiment, the AP sends the PPDU to a station in the first BSS, where a high efficiency signal field (for example, HE-SIG-A) or a MAC frame of the PPDU carries the indication information.

As shown in Table 1 herein below, Table 1 is a packet structure of one PPDU in an 802.11ax standard. The PPDU includes a legacy short training field (L-STF), a legacy long training field (L-LTF), and a legacy signal field (L-SIG) to ensure backward compatibility, so that a station in an earlier version standard can understand a legacy preamble part.

In addition, the packet structure of the PPDU further includes: a repeated legacy signal field (also referred to as repeated L-SIG, or RL-SIG), used to perform automatic check in 802.11ax and enhance L-SIG robustness; high efficiency signal field A (HE-SIG-A), used to carry information read by a station in both a local BSS and an OBSS, such as bandwidth and an AP identifier (AP ID), also referred to as a BBS Color, BSS color; and high efficiency signal field B (HE-SIG-B), mainly used to carry resource scheduling information read by a station in a local BSS. Next, high efficiency short training field (HE-STF) and high efficiency long training field (HE-LTF) are respectively used to perform multiple-input multiple-output (MIMO) automatic gain control (AGC) and MIMO channel measurement. Finally, a data part is used to carry a MAC frame.

TABLE 1

| Legacy short training field L-STF | Legacy long training field L-LTF | Legacy signal field and repeated legacy signal field L-SIG + RL-SIG | High efficiency signal field A HE-SIG-A | High efficiency signal field B HE-SIG-B | High efficiency short training field HE-STF HE-STF HE-STF | High efficiency long training field HE-LTF HE-LTF HE-LTF | Data Data Data Data |
|---|---|---|---|---|---|---|---|

The indication information provided in this embodiment of the present disclosure may be carried in a high efficiency signal field (for example, HE-SIG-A) or a MAC frame (for example, in a MAC frame header or a MAC frame body). This way, the second node in the second BSS may obtain the indication information from the PPDU sent by the AP in the first BSS to the station.

In one embodiment, in the indication information, two bits may be used to indicate whether the second node is allowed to perform parallel data transmission by spanning the time length of the PPDU and indicate the boundary crossing time length of the parallel data transmission. For example:

00 is used to indicate that the second node is not allowed to span the time length of the PPDU, where the boundary crossing time length is the time length of the PPDU;

01 is used to indicate that the second node is allowed to span the time length of the PPDU, where the boundary crossing time length is twice the time length of the PPDU;

10 is used to indicate that the second node is allowed to span the time length of the PPDU, where the boundary crossing time length is three times the time length of the PPDU; and 11 is used to indicate that the second node is allowed to span the time length of the PPDU, where the boundary crossing time length is four times the time length of the PPDU.

Certainly, an indication of the TXOP time length may exist in the HE-SIG-A or the MAC frame header. Therefore, indication may be performed in the indication information based on the TXOP time length. For example:

00 is used to indicate that the second node is not allowed to span the time length of the PPDU, where the boundary crossing time length is the time length of the PPDU;

01 is used to indicate that the second node is allowed to span the time length of the PPDU, where the boundary crossing time length is a quarter of the TXOP time length;

10 is used to indicate that the second node is allowed to span the time length of the PPDU, where the boundary crossing time length is half the TXOP time length; and 11 is used to indicate that the second node is allowed to span the time length of the PPDU, where the boundary crossing time length is the entire TXOP time length.

As another example, in the indication information, one bit is used to indicate whether the second node is allowed to perform parallel data transmission by spanning the time length of the PPDU, and if the second node is allowed to perform parallel data transmission by spanning the time length of the PPDU, two bits are used to indicate the boundary crossing time length of the parallel data transmission in the indication information. For example:

0 is used to indicate that the second node is not allowed to span the time length of the PPDU; or 1 is used to indicate that the second node is allowed to span the time length of the PPDU. In this case, indication is further performed:

00 indicates that the boundary crossing time length is twice the time length of the PPDU;

01 indicates that the boundary crossing time length is three times the time length of the PPDU;

10 indicates that the boundary crossing time length is four times the time length of the PPDU; and 11 indicates that the boundary crossing time length is the entire TXOP time length.

As another example, a TXOP may be divided into M time periods in advance. This way, in the indication information, M bits may be respectively used to indicate whether the second node is allowed to perform parallel data transmission in the M time periods of the TXOP, where $M \geq 1$. For example, the TXOP is divided into four time periods (for example, a TXOP 1, a TXOP 2, a TXOP 3, and a TXOP 4) in advance. If the indication information is 1101, it means that the second node is allowed to perform parallel data transmission in the TXOP 1, the TXOP 2, and the TXOP 4, but the second node is not allowed to perform parallel data transmission in the TXOP 3.

Similarly, in the indication information, N bits may be respectively used to indicate whether the second node is allowed to perform parallel data transmission in N time lengths of the PPDU, where $N \geq 1$. For example, if the indication information is 1101, it means that the second node is allowed to perform parallel data transmission in a first time length, a second time length, and a fourth time length of the PPDU, but the second node is not allowed to perform parallel data transmission in a third time length of the PPDU.

Certainly, the indication information may be designed in another manner. For example, because a quantity of bits in the MAC frame header or body is abundant in comparison with a quantity of bits in the HE-SIG-A, more bits may be used to indicate the boundary crossing time length in a finer-grained manner. This is not limited in this embodiment of the present disclosure.

Further, at 203, the second node in the second BSS obtains the PPDU sent by the AP in the first BSS, to obtain the indication information carried in the PPDU.

If the indication information indicates that the second node is not allowed to perform parallel data transmission by spanning the time length of the PPDU, in one embodiment, the second node performs (at 204) parallel data transmission in the time length of the PPDU.

If the indication information indicates that the second node is allowed to perform parallel data transmission by spanning the time length of the PPDU, in one embodiment, the second node performs (at 205) parallel data transmission in the boundary crossing time length.

In addition, if it needs to be ensured that parallel transmission on a secondary link on which the second node is located causes no interference to transmission in both directions between the transmit end and a receive end on the primary link, for example, short frame exchange is performed before the PPDU is transmitted on the primary link to inform the secondary link of a transmission/reception status of the primary link to an extent, a time length for one bidirectional exchange may be used as a reference for parallel transmission on the secondary link. In one embodiment, a sum of the time length of the PPDU and a time length of a response frame that responds to the PPDU is used as a time unit for parallel transmission on the secondary link. In this embodiment of the present disclosure, the sum of the time length of the PPDU and the time length of the response frame that responds to the PPDU is referred to as an extended time length, in other words, Extended time length=Time length of a PPDU+Time length of a response frame that responds to the PPDU. This way, the boundary crossing time length in the solution may be replaced with the extended time length, so that no interference is caused to transmission in both directions between the transmit end and the receive end on the primary link.

For example, if the indication information indicates that the second node is not allowed to perform parallel data transmission by spanning the time length of the PPDU, the second node performs parallel data transmission in the extended time length.

Further, in one embodiment, after the second node obtains the indication information carried in the PPDU sent by the AP (at 203), the second node may further perform channel contention based on a backoff mechanism, so as to perform parallel data transmission on a channel obtained through contention. A method for performing channel contention by the second node based on the backoff mechanism may be described in detail in a subsequent embodiment. Details are not described herein.

In addition, when a transmit end on a primary link is a station (e.g., a first node is a station), the station may indicate, to a second node in a second BSS, whether the second node is allowed to perform parallel data transmission in a time length of a PPDU and indicate a boundary crossing time length of the parallel data transmission.

There are two possible implementations in this scenario. In a first implementation, the station directly adds, to a PPDU that needs to be generated, indication information delivered by an AP, and then sends the indication information to the second node by sending the PPDU. In a second implementation, with reference to a time length of a PPDU and a TXOP time length, the station generates indication information based on an indication parameter sent by an AP, then adds the indication information to the PPDU, and sends the indication information to the second node by sending the PPDU.

Figure 5:
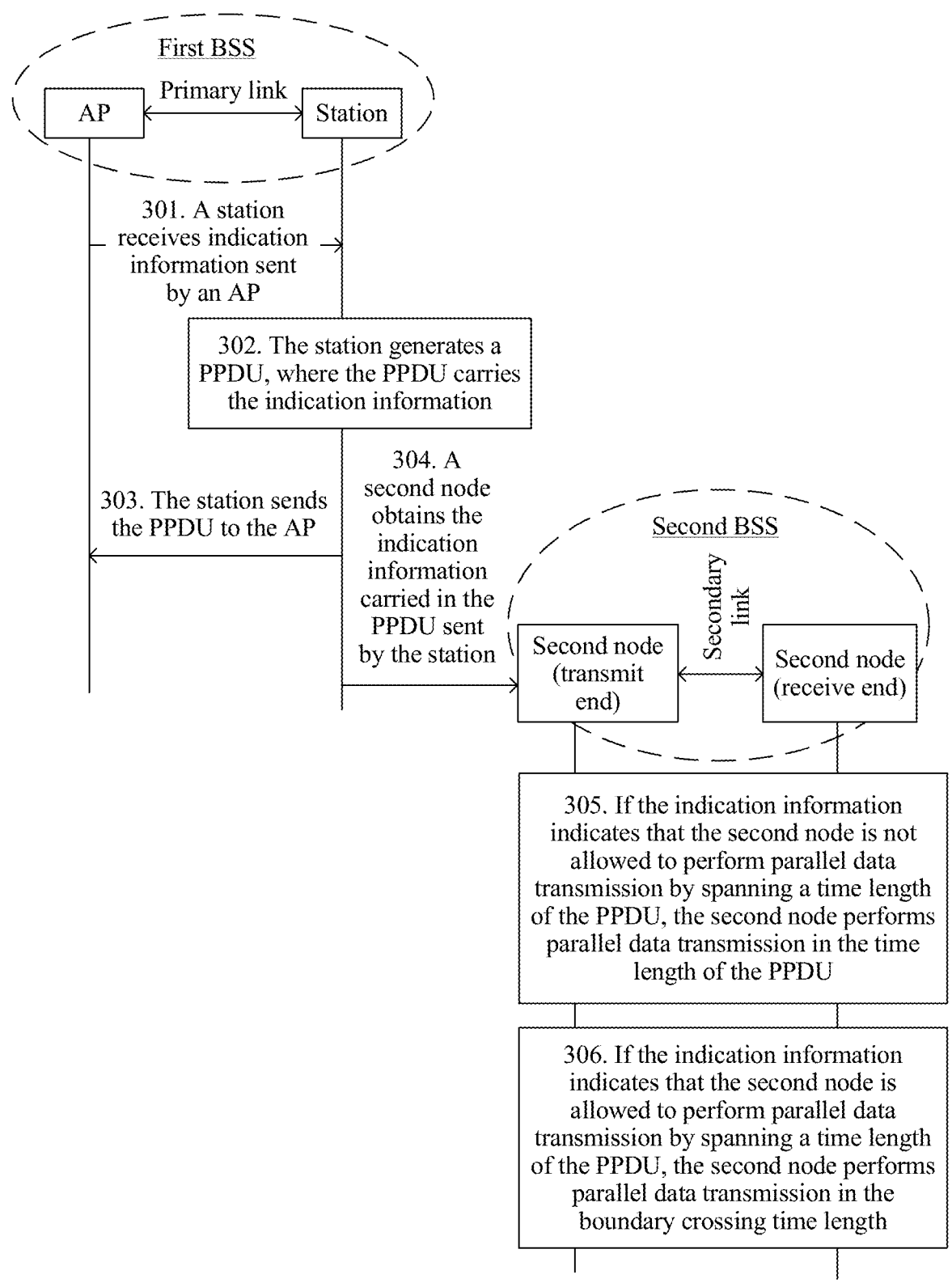
FIG. 5 is a diagram 2 of interaction of a parallel data transmission method according to an embodiment of the present disclosure.

The first implementation is used as an example below to describe a possible implementation of the parallel data transmission method according to an embodiment of the present disclosure. As shown in FIG. 5, the method includes the following steps:

At 301, a station in a first BSS receives indication information sent by an AP in the first BSS, where the indication information is used to indicate whether a second node is allowed to perform parallel data transmission by spanning a time length of a PPDU and indicate a boundary crossing time length of the parallel data transmission.

At 302, the station generates a PPDU, where the PPDU carries the indication information.

At 303, the station sends the PPDU to the AP or another station in the first BSS, where a high efficiency signal field or a MAC frame of the PPDU carries the indication information.

At 304, the second node obtains the indication information carried in the PPDU sent by the station.

At 305, if the indication information indicates that the second node is not allowed to perform parallel data transmission by spanning the time length of the PPDU, the second node performs parallel data transmission in the time length of the PPDU.

At 306, if the indication information indicates that the second node is allowed to perform parallel data transmission by spanning the time length of the PPDU, the second node performs parallel data transmission in the boundary crossing time length.

At 301, the AP in the first BSS directly sends the indication information to the station. For example, the AP adds the indication information to the PPDU, and sends the PPDU to the station. For a method for directly sending the indication information by the AP to the station, refer to 201 and 202 of FIG. 4. For brevity sake, details are not described herein again.

Further, at 302, in one embodiment the station may directly add the indication information to the PPDU to generate the PPDU.

This way, at 303, in one embodiment the station that serves as a transmit end on a primary link may send the PPDU to a receive end on the primary link, the AP or another station in the first BSS. The high efficiency signal field or the MAC frame of the PPDU carries the indication information.

Further, at 304, a transmit end on a secondary link, namely, the second node in a second BSS, may obtain the indication information by obtaining the PPDU, so as to determine, based on the indication information, whether the second node during parallel transmission on the secondary link can span the time length in which the station on the primary link transmits the PPDU, and determine the boundary crossing time length of the parallel data transmission.

For details of at 305 and 306, refer to descriptions of step 204 and step 205. For brevity sake, details are not described herein again.

Figure 6:
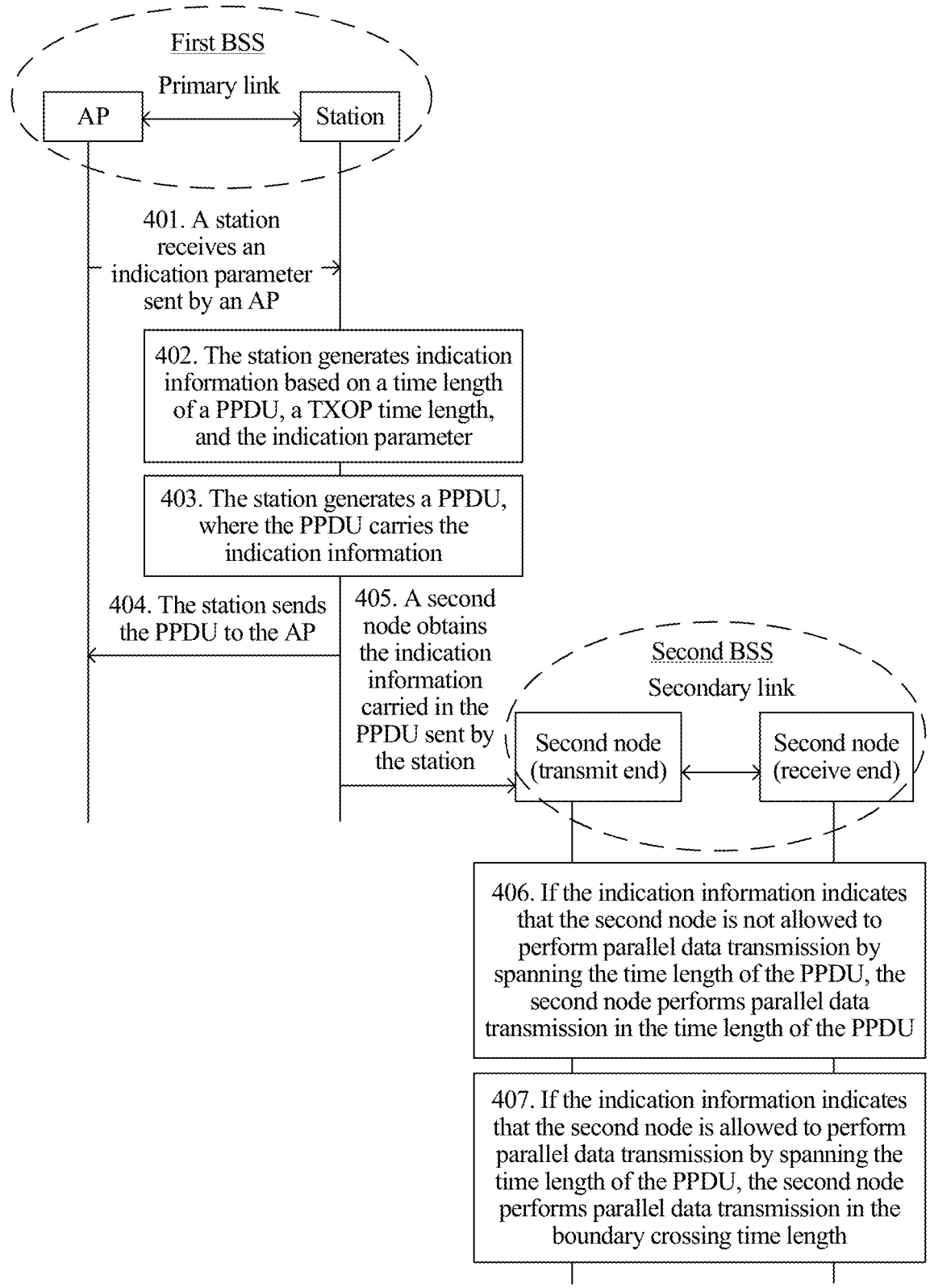
FIG. 6 is a diagram 3 of interaction of a parallel data transmission method according to an embodiment of the present disclosure.

The second implementation is used as an example below to describe a possible implementation of the parallel data transmission method according to an embodiment of the present disclosure. As shown in FIG. 6, the method includes the following steps:

At 401, a station in a first BSS receives an indication parameter sent by an AP in the first BSS, where the indication parameter is used to indicate whether the AP allows a second node to perform parallel data transmission by spanning a time length of a PPDU and indicate a boundary crossing time length of the parallel data transmission.

At 402, the station generates indication information based on the time length of the PPDU, a TXOP time length, and the indication parameter, where the indication information is used to indicate whether the station allows the second node to perform parallel data transmission by spanning the time length of the PPDU and indicate the boundary crossing time length of the parallel data transmission.

At 403, the station generates a PPDU, where the PPDU carries the indication information.

At 404, the station sends the PPDU to the AP or another station in the first BSS, where a high efficiency signal field or a MAC frame of the PPDU carries the indication information.

At 405, the second node obtains the indication information carried in the PPDU sent by the station.

At 406, if the indication information indicates that the second node is not allowed to perform parallel data transmission by spanning the time length of the PPDU, where the second node performs parallel data transmission in the time length of the PPDU.

At 407, if the indication information indicates that the second node is allowed to perform parallel data transmission by spanning the time length of the PPDU, where the second node performs parallel data transmission in the boundary crossing time length.

At 401, in one embodiment the station receives the indication parameter sent by the AP, where the indication parameter is used to indicate whether the AP allows the second node to perform parallel data transmission by spanning the time length of the PPDU and indicate the boundary crossing time length of the parallel data transmission.

This way, at 402, in one embodiment the station may determine, based on the time length of the PPDU, the TXOP time length, and the indication parameter in step 401, whether the station (itself) allows the second node to perform parallel data transmission by spanning the time length of the PPDU, and determine the boundary crossing time length of the parallel data transmission, to generate the indication information.

For example, the AP sends the indication parameter, to indicate whether the AP allows the second node to perform parallel transmission by spanning the time length of the PPDU, and indicate that the boundary crossing time length is three time lengths of the PPDU. In this case, a station on a primary link determines, through calculation, that a remaining time length in the three time lengths of the PPDU that are indicated by the AP is twice a time length required by the station to transmit the PPDU. Therefore, when the station serves as a transmit end on the primary link, the station may generate the indication information, to indicate that the station allows the second node to perform parallel transmission by spanning the time length of the PPDU, and indicate that the boundary crossing time length is twice the time length of the PPDU.

Correspondingly, if the station on the primary link determines, through calculation, that a remaining time length in the three time lengths of the PPDU that are indicated by the AP is the time length required by the station to transmit the PPDU, the station may generate the indication information, to indicate that the station does not allow the second node to perform parallel transmission by spanning the time length of the PPDU.

Because a granularity is not fine enough, a station side may determine a minimum value, to ensure that the boundary crossing time length indicated by the indication information generated by the station is less than the boundary crossing time length in the indication parameter sent by the AP.

Similar to the foregoing method, a remaining TXOP time length may be further compared with the boundary crossing time length in the indication parameter sent by the AP, to determine whether the station allows the second node to perform parallel data transmission by spanning the time length of the PPDU, and determine the boundary crossing time length of the parallel data transmission.

Further, similar to 302 and 303, at 403, the station generates the PPDU, where the PPDU carries the indication information. At 404, the station sends the PPDU to the AP or another station in the first BSS, where the high efficiency signal field or the MAC frame of the PPDU carries the indication information.

For details of 405 to 407, refer to related descriptions of 304 to 306. For brevity sake, details are not described herein again.

It should be noted that the PPDU that carries the indication information may be sent by the AP in the first BSS or the station in the first BSS. Therefore, the second node in a second BSS may separately obtain indication information from the AP and the station. In one embodiment, the second node obtains a PPDU sent by the AP. The PPDU sent by the AP carries first indication information. The first indication information is used to indicate whether the AP allows the second node to perform parallel data transmission by spanning the time length of the PPDU and indicate a boundary crossing time length of the parallel data transmission. In addition, the second node obtains a PPDU sent by the station. The PPDU sent by the station carries second indication information. The second indication information is used to indicate whether the station allows the second node to perform parallel data transmission by spanning the time length of the PPDU and indicate a boundary crossing time length of the parallel data transmission.

In this case, the second node selects the first indication information or the second indication information as the indication information. Alternatively, the second node uses the first indication information as the indication information.

When selecting the first indication information or the second indication information as the indication information, the second node may further compare the boundary crossing time length indicated by the first indication information with the boundary crossing time length indicated by the second indication information, and use the first indication information or the second indication information with a shorter boundary crossing time length as the indication information.

In conclusion, the embodiments of the present disclosure provide the parallel data transmission method. The first node in the first BSS generates the PPDU. The PPDU carries the indication information. The indication information is used to indicate whether the second node in the second BSS is allowed to perform parallel data transmission by spanning the time length of the PPDU and indicate the boundary crossing time length of the parallel data transmission. The first node belongs to the first basic service set BSS, and the second node belongs to the second BSS. Further, the first node sends the PPDU, so that the second node can determine, based on the indication information, whether to perform parallel transmission across a boundary of the PPDU, and determine a boundary crossing time length of the parallel transmission. Therefore, a problem where the primary link changes and parallel transmission on the secondary link causes interference to data transmission on the changed primary link is avoided. In other words, link interference brought by parallel transmission across the boundary of the PPDU can be reduced.

Further, as described in the foregoing embodiments, when the transmit end (e.g., the AP or the station in the first BSS) on the primary link sends the PPDU that carries the indication information to a receive end on the primary link, a transmit end (e.g., the second node in the second BSS) on the secondary link may obtain the indication information carried in the PPDU. However, the indication information may be obtained by a plurality of second nodes. Therefore, after the second node obtains the indication information carried in the PPDU, the second node may further perform channel contention based on a backoff mechanism, so as to perform parallel data transmission on a channel obtained through contention.

Figure 7:
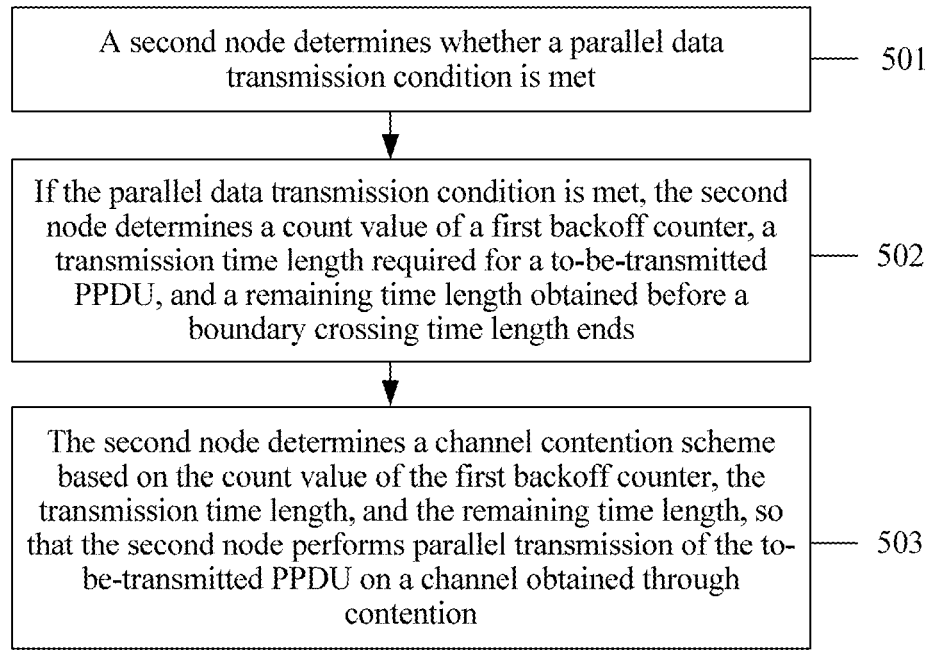
FIG. 7 is a flowchart 2 of a parallel data transmission method according to an embodiment of the present disclosure.

In this case, based on the problem of how to perform channel contention based on the backoff mechanism, an embodiment of the present disclosure provides a parallel data transmission method. As shown in FIG. 7, the method includes the following steps.

At 501, a second node determines whether a parallel data transmission condition is met.

For example, after the second node obtains indication information in a PPDU sent by the first node and discovers that the PPDU is from an OBSS and that signal strength received by the second node is less than a threshold in a time period, a channel is considered as idle after physical carrier sense. In addition, if another station in a local BSS does not set a NAV for the second node, the channel is considered as idle after virtual carrier sense. Therefore, if the channel is idle after both the physical carrier sense and the virtual carrier sense, the second node may determine that the parallel data transmission condition is met.

At 502, if the parallel data transmission condition is met, the second node determines a count value of a first backoff counter, a transmission time length required for a to-be-transmitted PPDU, and a remaining time length obtained before a boundary crossing time length ends.

In one embodiment, if the parallel data transmission condition is met, the second node may determine the count value of the first backoff counter. For example, the second node determines the count value of the first backoff counter based on a size of a first backoff window corresponding to the first backoff counter. For another example, if the first backoff counter with a count value of 10 is suspended after the PPDU is transmitted last time, the second node may resume the first backoff counter, to be specific, continue to perform backoff from the count value of 10.

In addition, if the parallel data transmission condition is met, the second node needs to determine the remaining time length obtained before the boundary crossing time length ends. Because a boundary crossing time length, for example, 500 microseconds, in which the second node is allowed to perform parallel data transmission is indicated in the indication information obtained by the second node, the second node may calculate a remaining time length between a current moment and the end of the boundary crossing time length. As another example, the boundary crossing time length may be determined by the second node. This is not limited in this embodiment of the present disclosure.

In addition, if the parallel data transmission condition is met, the second node further needs to determine the transmission time length required for the to-be-transmitted PPDU, for example, 100 microseconds.

At 503, the second node determines a channel contention scheme based on the count value of the first backoff counter, the transmission time length, and the remaining time length, so that the second node performs parallel transmission of the to-be-transmitted PPDU on a channel obtained through contention.

The following separately describes methods for determining, by the second node, different channel contention schemes based on the count value of the first backoff counter, the transmission time length, and the remaining time length that are obtained at 502.

Method 1

The second node starts to perform, by using the first backoff counter, backoff from the count value determined at 502. When the first backoff counter falls back to 0, the second node compares the transmission time length required for the to-be-transmitted PPDU with the remaining time length obtained before the boundary crossing time length ends. If the remaining time length is less than the transmission time length, the second node may determine that the channel contention scheme is to perform channel contention again after the boundary crossing time length ends, or immediately perform channel contention again.

For example, the second node starts to perform backoff from the count value of 10 by using the first backoff counter. When the first backoff counter falls back to 0, the transmission time length required for the to-be-transmitted PPDU is 200 microseconds, and the remaining time length obtained before the boundary crossing time length ends is 100 microseconds. In other words, the remaining time length is less than the transmission time length. Obviously, in this case, the second node cannot perform parallel transmission of the to-be-transmitted PPDU in the remaining time length. Therefore, the second node may perform channel contention again after the boundary crossing time length ends. Alternatively, the second node may change the to-be-transmitted PPDU, for example, change a to-be-transmitted PPDU 1 into a to-be-transmitted PPDU 2. In addition, a transmission time length required for the to-be-transmitted PPDU 2 is 90 microseconds. In other words, the remaining time length is greater than the transmission time length. Therefore, the second node may immediately perform channel contention again, so that the second node performs parallel transmission of the to-be-transmitted PPDU 2 on a channel obtained through contention.

Further, when the second node performs channel contention again after the boundary crossing time length ends or immediately performs channel contention again, the second node needs to reset the size of the first backoff window, maintain the size of the first backoff window, or double the size of the first backoff window, so that the second node resets the count value of the first backoff counter based on the size of the first backoff window, and continues to perform backoff based on a reset count value of the first backoff counter.

In one embodiment, a collision situation may occur when a plurality of second nodes may fall back to 0 in the boundary crossing time length, and simultaneously start to perform channel contention after the boundary crossing time length ends. Therefore, maintaining or doubling the size of the first backoff window helps avoid a problem that sizes of first backoff windows of excessive second nodes are suddenly changed into minimum values, and simultaneous channel contention results in collision.

Method 2

Different from Method 1, when the first backoff counter falls back to 0, the second node compares the transmission time length required for the to-be-transmitted PPDU with the remaining time length obtained before the boundary crossing time length ends. If the remaining time length is not less than the transmission time length, the second node may determine that the channel contention scheme is to perform parallel transmission of the to-be-transmitted PPDU immediately.

In addition, the second node may further perform channel contention again after the boundary crossing time length ends. Alternatively, similar to Method 1, the second node may immediately perform channel contention again.

Certainly, when the second node performs channel contention again after the boundary crossing time length ends or immediately performs channel contention again, the second node needs to reset the size of the first backoff window, so that the second node resets the count value of the first backoff counter based on the size of the first backoff window, and continues to perform backoff based on a reset count value of the first backoff counter.

Method 3

In Method 3, the second node does not need to compare, after the first backoff counter falls back to 0, the transmission time length required for the to-be-transmitted PPDU with the remaining time length obtained before the boundary crossing time length ends, but directly determines, through calculation after 502 based on the count value of the first backoff counter, whether the first backoff counter can fall back to 0 and the to-be-transmitted PPDU can be sent in the remaining time length. In other words, the second node may directly determine, through calculation, whether a sum of a time length required by the first backoff counter to fall back to 0 and the transmission time length required for the to-be-transmitted PPDU is less than the remaining time length obtained before the boundary crossing time length ends.

If the first backoff counter cannot fall back to 0 and the to-be-transmitted PPDU cannot be sent in the boundary crossing time length, the second node may determine that the channel contention scheme is to suspend the first backoff counter, and continue to perform channel contention by using the first backoff counter after the boundary crossing time length ends.

Method 4

In Method 4, a second backoff counter may be introduced. In other words, the second node performs channel contention by using two backoff counters (the first backoff counter and the second backoff counter).

In one embodiment, when the second node serves as a transmit end on a primary link, the second node may perform channel contention by using the second backoff counter. When the second node serves as a transmit end on a secondary link, after the second node determines whether the parallel data transmission condition is met (at 501), if the parallel data transmission condition is met, the second node may suspend the second backoff counter, and perform channel contention by using the first backoff counter.

Similar to Method 1, the second node starts to perform, by using the first backoff counter, backoff from the count value determined at 502. When the first backoff counter falls back to 0, the second node compares the transmission time length required for the to-be-transmitted PPDU with the remaining time length obtained before the boundary crossing time length ends. If the remaining time length is less than the transmission time length, the second node may determine that the channel contention scheme is to perform channel contention again after the boundary crossing time length ends, or immediately perform channel contention again.

In addition, when the second node performs channel contention again after the boundary crossing time length ends or immediately performs channel contention again, the second node needs to reset the size of the first backoff window, maintain the size of the first backoff window, or double the size of the first backoff window, so that the second node resets the count value of the first backoff counter based on the size of the first backoff window, and continues to perform backoff based on a reset count value of the first backoff counter.

Different from Method 1, when the second node performs channel contention again after the boundary crossing time length ends, the second node may determine whether a channel is idle by using carrier sense. If the second node discovers that the channel is idle, the second node may resume the second counter suspended before, and, as the transmit end on the primary link, perform channel contention by using the second backoff counter. If the second node discovers that primary link transmission exists on the channel, and the parallel data transmission condition is met, the second node may perform channel contention by using the first counter.

Similar to Method 2, when the first backoff counter falls back to 0, the second node compares the transmission time length required for the to-be-transmitted PPDU with the remaining time length obtained before the boundary crossing time length ends. If the remaining time length is not less than the transmission time length, the second node may determine that the channel contention scheme is to perform parallel transmission of the to-be-transmitted PPDU immediately.

In addition, the second node may further reset the size of the first backoff window, and perform channel contention again after the boundary crossing time length ends, or immediately perform channel contention again.

Different from Method 2, when the second node performs channel contention again after the boundary crossing time length ends, the second node may determine whether a channel is idle by using carrier sense. If the second node discovers that the channel is idle, the second node may resume the second counter suspended before, and, as the transmit end on the primary link, perform channel contention by using the second backoff counter. If the second node discovers that primary link transmission exists on the channel, and the parallel data transmission condition is met, the second node may perform channel contention by using the first counter.

Similar to Method 3, if the first backoff counter cannot fall back to 0 and the to-be-transmitted PPDU cannot be sent in the boundary crossing time length, the second node may determine that the channel contention scheme is to suspend the first backoff counter.

Different from Method 3, after the boundary crossing time length ends, the second node may determine whether a channel is idle by using carrier sense. If the second node discovers that the channel is idle, the second node may resume or reset the second counter suspended before, and, as the transmit end on the primary link, perform channel contention by using the second backoff counter. If the second node discovers that primary link transmission exists on the channel, and the parallel data transmission condition is met, the second node may perform channel contention by using the first counter.

It should be noted that the first backoff counter may be a unified counter for all services, or a plurality of counters for different services. Similarly, the second backoff counter may be a unified counter for all services, or a plurality of counters for different services.

It may be learned that two backoff counters are used in Method 4, so that fairness is ensured when the transmit end on the primary link and the transmit end on the secondary link perform channel contention. Parallel transmission is used as an additional transmission opportunity of the second node on the secondary link, so that transmission efficiency is improved.

In conclusion, this embodiment of the present disclosure provides the parallel data transmission method. The second node determines whether the parallel data transmission condition is met. If the parallel data transmission condition is met, the second node determines the count value of the first backoff counter, the transmission time length required for the to-be-transmitted PPDU, and the remaining time length obtained before the boundary crossing time length ends. Further, based on the count value, the transmission time length, and the remaining time length, the second node determines different channel contention schemes in different application scenarios, so that the second node performs parallel transmission of the to-be-transmitted PPDU on the channel obtained through contention.

Figure 8:
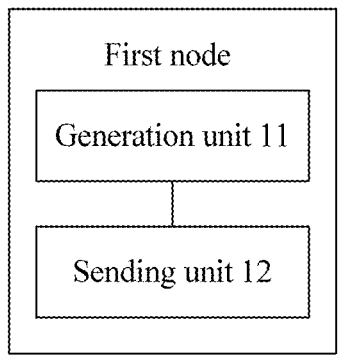
FIG. 8 is a schematic structural diagram 1 of a first node according to an embodiment of the present disclosure.

In addition, FIG. 8 is a schematic structural diagram of a first node according to an embodiment of the present disclosure. The first node provided in this embodiment of the present disclosure may be configured to perform the method in the embodiments of the present disclosure shown in FIG. 1 to FIG. 7. For ease of description, only a part related to this embodiment of the present disclosure is shown. For undisclosed technical details, refer to the embodiments of the present disclosure shown in FIG. 1 to FIG. 7.

In one embodiment, as shown in FIG. 8, the first node includes:

a generation unit 11, configured to generate a PPDU, where the PPDU carries indication information, the indication information is used to indicate whether a second node is allowed to perform parallel data transmission by spanning a time length of the PPDU and indicate a boundary crossing time length of the parallel data transmission, the first node belongs to a first BSS, and the second node belongs to a second BSS; and a sending unit 12, configured to send the PPDU.

It should be noted that the first node may be an AP or a station in the first BSS.

If the first node is an access point AP in the first BSS, in one embodiment the sending unit 12 is configured to send the PPDU to a station in the first BSS. A high efficiency signal field or a MAC frame of the PPDU carries the indication information.

In the indication information, two bits are used to indicate whether the second node is allowed to perform parallel data transmission by spanning the time length of the PPDU and indicate the boundary crossing time length of the parallel data transmission; or in the indication information, one bit is used to indicate whether the second node is allowed to perform parallel data transmission by spanning the time length of the PPDU, and if the second node is allowed to perform parallel data transmission by spanning the time length of the PPDU, two bits are used to indicate the boundary crossing time length of the parallel data transmission in the indication information.

Alternatively, in the indication information, M bits are respectively used to indicate whether the second node is allowed to perform parallel data transmission in M time periods in a transmission opportunity TXOP time length, where M≥1; or in the indication information, N bits are respectively used to indicate whether the second node is allowed to perform parallel data transmission in N time lengths of the PPDU, where N≥1.

Figure 9:
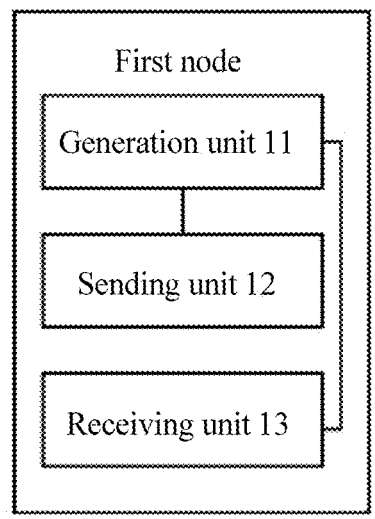
FIG. 9 is a schematic structural diagram 2 of a first node according to an embodiment of the present disclosure.

In addition, as shown in FIG. 9, if the first node is a station in the first BSS, the first node further includes a receiving unit 13. The receiving unit 13 is configured to receive indication information sent by an AP in the first BSS. The indication information is used to indicate whether the second node is allowed to perform parallel data transmission by spanning the time length of the PPDU and indicate the boundary crossing time length of the parallel data transmission. The generation unit 11 is specifically configured to generate a PPDU. The PPDU carries the indication information.

Alternatively, when the first node is a station in the first BSS, the receiving unit 13 is configured to receive an indication parameter sent by an AP in the first BSS. The indication parameter is used to indicate whether the AP allows the second node to perform parallel data transmission by spanning the time length of the PPDU and indicate the boundary crossing time length of the parallel data transmission. In one embodiment, the generation unit 11 is configured to: generate indication information based on the time length of the PPDU, a TXOP time length, and the indication parameter, where the indication information is used to indicate whether the station allows the second node to perform parallel data transmission by spanning the time length of the PPDU and indicate the boundary crossing time length of the parallel data transmission; and generate a PPDU, where the PPDU carries the indication information.

Figure 10:
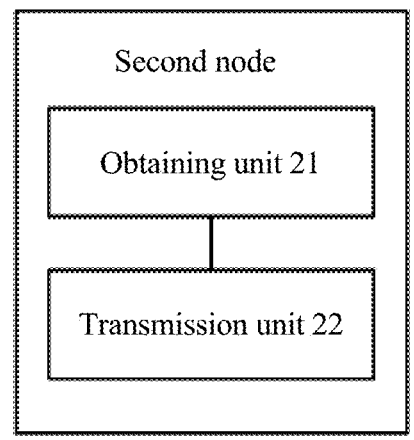
FIG. 10 is a schematic structural diagram 1 of a second node according to an embodiment of the present disclosure.

FIG. 10 is a schematic structural diagram of a second node according to an embodiment of the present disclosure. The second node provided in this embodiment of the present disclosure may be configured to perform the method in the embodiments of the present disclosure shown in FIG. 1 to FIG. 7. For ease of description, only a part related to this embodiment of the present disclosure is shown. For undisclosed technical details, refer to the embodiments of the present disclosure shown in FIG. 1 to FIG. 7.

The second node may be an AP or a station in the second BSS. This is not limited in the present disclosure.

In one embodiment, as shown in FIG. 10, the second node includes:

an obtaining unit 21, configured to obtain a PPDU sent by a first node, where the PPDU carries indication information, where the indication information is used to indicate whether the second node is allowed to perform parallel data transmission by spanning a time length of the PPDU and indicate a boundary crossing time length of the parallel data transmission, the first node belongs to a first BSS, and the second node belongs to a second BSS; and a transmission unit 22, configured to: if the first node indicates that the second node is not allowed to perform parallel data transmission by spanning the time length of the PPDU, perform parallel data transmission in the time length of the PPDU; or if the first node indicates that the second node is allowed to perform parallel data transmission by spanning the time length of the PPDU, perform parallel data transmission in the boundary crossing time length.

Figure 11:
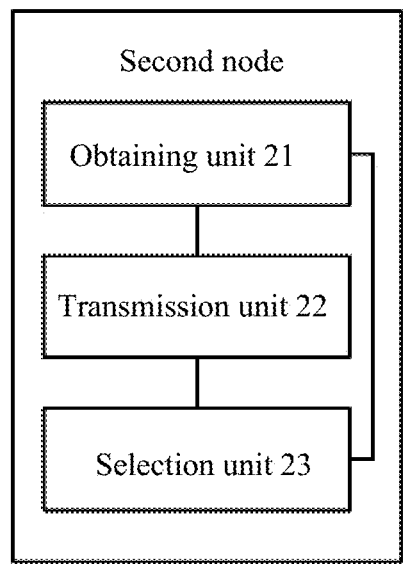
FIG. 11 is a schematic structural diagram 2 of a second node according to an embodiment of the present disclosure.

Further, the first node is an AP or a station in the first BSS. As shown in FIG. 11, the second node further includes a selection unit 23. In one embodiment, the obtaining unit 21 is configured to obtain a PPDU sent by the AP, where the PPDU sent by the AP carries first indication information, where the first indication information is used to indicate whether the AP allows the second node to perform parallel data transmission by spanning a time length of the PPDU and indicate a boundary crossing time length of the parallel data transmission; or obtain a PPDU sent by the station, where the PPDU sent by the station carries second indication information, the second indication information is used to indicate whether the station allows the second node to perform parallel data transmission by spanning a time length of the PPDU and indicate a boundary crossing time length of the parallel data transmission. The selection unit 23 is configured to select the first indication information or the second indication information as the indication information; or the second node uses the first indication information as the indication information.

In one embodiment, the selection unit 23 is configured to compare the boundary crossing time length indicated by the first indication information with the boundary crossing time length indicated by the second indication information; and use the first indication information or the second indication information with a shorter boundary crossing time length as the indication information.

In conclusion, parallel data transmission may be implemented by using the first node and the second node provided in the embodiments of the present disclosure. When transmitting the PPDU, a transmit end on a primary link, namely, the first node, explicitly indicates, to a transmit end on a secondary link, namely, the second node, whether the second node is allowed to perform parallel data transmission by spanning the time length of the PPDU, and indicates the boundary crossing time length of the parallel data transmission. Therefore, the second node may determine, based on the indication information, whether to perform parallel transmission across a boundary of the PPDU, and determine a boundary crossing time length of the parallel transmission, to avoid a problem where the primary link changes and parallel transmission on the secondary link causes interference to data transmission on the changed primary link. In other words, link interference brought by parallel transmission across the boundary of the PPDU can be reduced.

Figure 12:
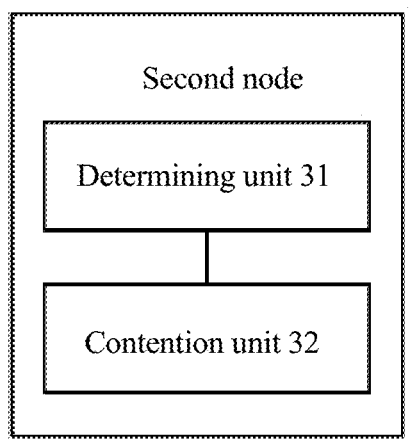
FIG. 12 is a schematic structural diagram 3 of a second node according to an embodiment of the present disclosure.

Further, based on related descriptions at 501 to 503 in the foregoing embodiment and the method for performing channel contention based on the backoff mechanism, an embodiment of the present disclosure provides a second node. As shown in FIG. 12, the second node includes:

a determining unit 31, configured to determine whether a parallel data transmission condition is met; and if the parallel data transmission condition is met, determine a count value of a first backoff counter, a transmission time length required for a to-be-transmitted physical protocol data unit PPDU, and a remaining time length obtained before a boundary crossing time length ends; and a contention unit 32, configured to determine a channel contention scheme based on the count value of the first backoff counter, the transmission time length required for the to-be-transmitted PPDU, and the remaining time length obtained before the boundary crossing time length ends, so that the second node performs parallel transmission of the to-be-transmitted PPDU on a channel obtained through contention.

Figure 13:
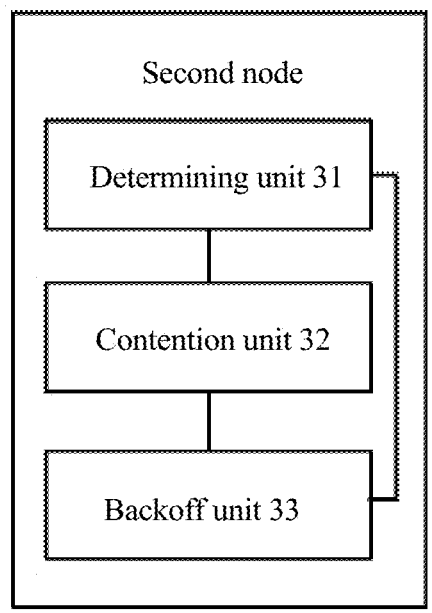
FIG. 13 is a schematic structural diagram 4 of a second node according to an embodiment of the present disclosure.

Further, as shown in FIG. 13, the second node further includes a backoff unit 33. In one embodiment, the backoff unit 33 is configured to start to perform backoff from the count value by using the first backoff counter. In one embodiment, the contention unit 32 is configured to: when the first backoff counter falls back to 0, if the remaining time length is less than the transmission time length, determine that the channel contention scheme is to perform channel contention again after the boundary crossing time length ends, or immediately perform channel contention again.

Further, the contention unit 32 is further configured to reset a size of a first backoff window, maintain the size of the first backoff window, or double the size of the first backoff window, so that the second node resets the count value of the first backoff counter based on the size of the first backoff window.

Alternatively, the contention unit 32 is configured to: when the first backoff counter falls back to 0, if the remaining time length is not less than the transmission time length, determine that the channel contention scheme is to perform parallel transmission of the to-be-transmitted PPDU immediately.

In this case, the contention unit 32 is further configured to perform channel contention again after the boundary crossing time length ends, or immediately perform channel contention again; and reset the size of the first backoff window, so that the second node updates the count value of the first backoff counter based on the size of the first backoff window.

Figure 14:
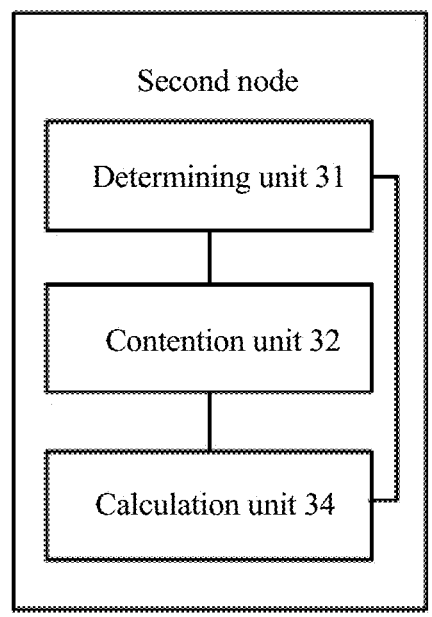
FIG. 14 is a schematic structural diagram 5 of a second node according to an embodiment of the present disclosure.

Alternatively, as shown in FIG. 14, the second node further includes a calculation unit 34. In one embodiment, the calculation unit 34 is configured to determine, through calculation based on the count value, whether the first backoff counter can fall back to 0 and the to-be-transmitted PPDU can be sent in the remaining time length. The contention unit 32 is specifically configured to: if the first backoff counter cannot fall back to 0 in the boundary crossing time length, and the second node sends the to-be-transmitted PPDU, determine that the channel contention scheme is to suspend the first backoff counter, and continue to perform channel contention by using the first backoff counter after the boundary crossing time length ends.

Further, the second node further includes a second backoff counter. The contention unit 32 is configured to: if the parallel data transmission condition is met, suspend the second backoff counter; and after the boundary crossing time length ends, if it is detected that the channel is in an idle state, resume the second backoff counter, and perform channel contention by using the second backoff counter.

In conclusion, this embodiment of the present disclosure provides the second node. The second node determines whether the parallel data transmission condition is met. If the parallel data transmission condition is met, the second node determines the count value of the first backoff counter, the transmission time length required for the to-be-transmitted PPDU, and the remaining time length obtained before the boundary crossing time length ends. Further, based on the count value, the transmission time length, and the remaining time length, the second node determines different channel contention schemes in different application scenarios, so that the second node performs parallel transmission of the to-be-transmitted PPDU on the channel obtained through contention.

Figure 15:
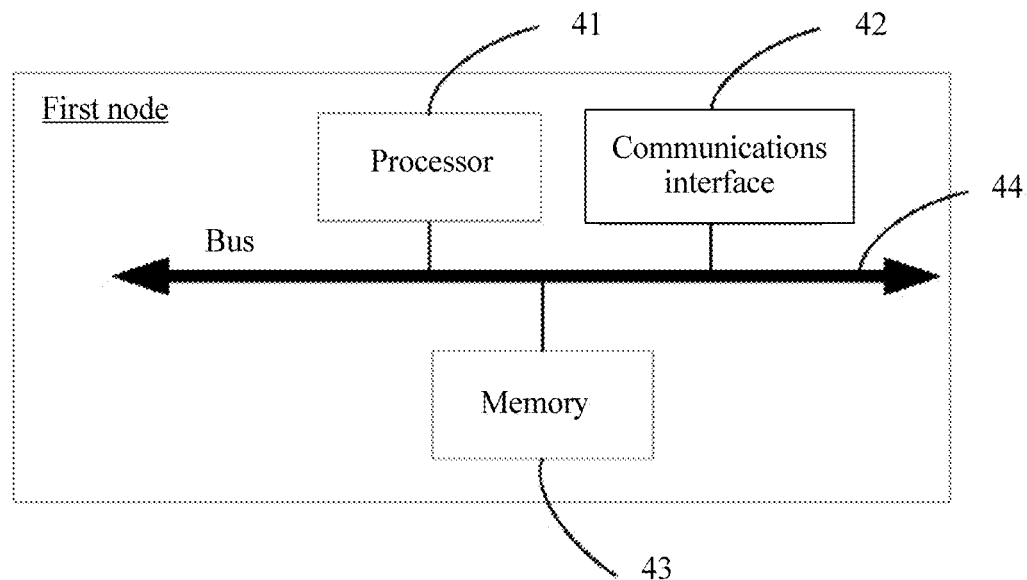
FIG. 15 is a schematic structural diagram of hardware of a first node according to an embodiment of the present disclosure.

In addition, FIG. 15 is a schematic structural diagram of hardware of a first node according to an embodiment of the present disclosure. The first node provided in this embodiment of the present disclosure may be configured to perform the method in the embodiments of the present disclosure shown in FIG. 1 to FIG. 6. For ease of description, only a part related to this embodiment of the present disclosure is shown. For undisclosed technical details, refer to the embodiments of the present disclosure shown in FIG. 1 to FIG. 6.

The first node may be an AP or a station in a first BSS. This is not limited in the present disclosure. The first node may be any hardware product that can meet an operation capability requirement.

In one embodiment, as shown in FIG. 15, the first node includes a processor 41, a communications interface 42, and a memory 43. In addition, the processor 41, the communications interface 42, and the memory 43 communicate with each other by using a bus 44.

The memory 43 is configured to store a computer executable instruction. The processor 41 and the memory 43 are connected by using the bus 44. When the first node runs, the processor 41 executes the computer executable instruction stored in the memory 42, so that the first node performs the parallel data transmission method shown in FIG. 3 to FIG. 6. For the specific parallel data transmission method, refer to related description in the embodiment shown in any one of FIG. 3 to FIG. 6. For brevity sake, the details are not described herein again.

Figure 16:
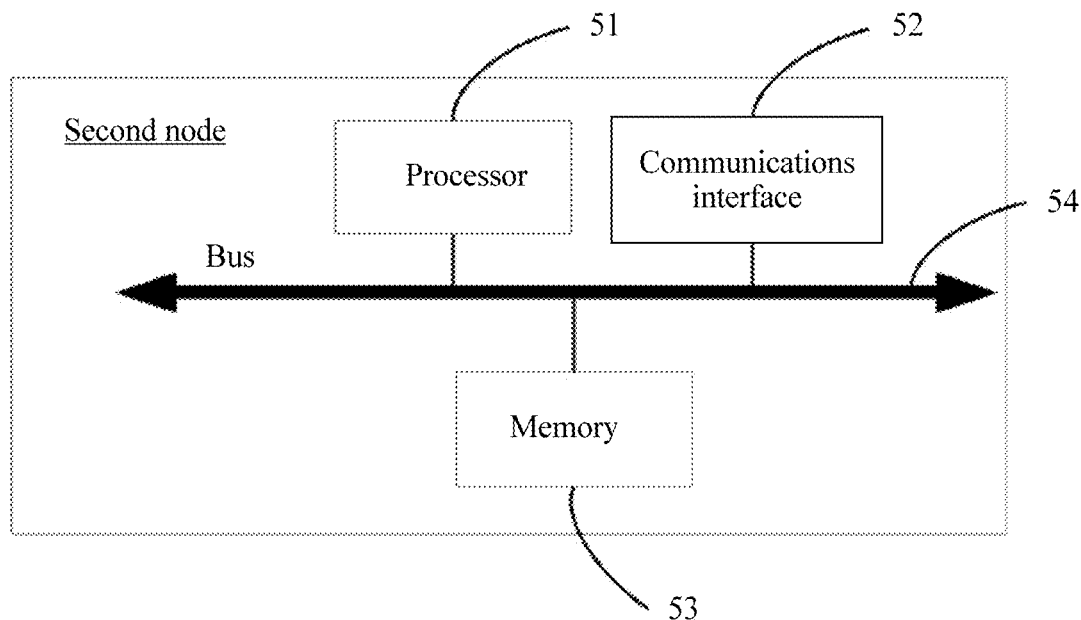
FIG. 16 is a schematic structural diagram of hardware of a second node according to an embodiment of the present disclosure.

Similarly, FIG. 16 is a schematic structural diagram of hardware of a second node according to an embodiment of the present disclosure. The second node provided in this embodiment of the present disclosure may be configured to perform the method in the embodiments of the present disclosure shown in FIG. 1 to FIG. 7. For ease of description, only a part related to this embodiment of the present disclosure is shown. For undisclosed technical details, refer to the embodiments of the present disclosure shown in FIG. 1 to FIG. 7.

The second node may be an AP or a station in a second BSS. This is not limited in the present disclosure. The second node may be any hardware product that can meet an operation capability requirement.

In one embodiment, as shown in FIG. 16, the second node includes a processor 51, a communications interface 52, and a memory 53. In addition, the processor 51, the communications interface 52, and the memory 53 communicate with each other by using a bus 54.

The memory 53 is configured to store a computer executable instruction.

The processor 51 and the memory 53 are connected by using the bus 54. When the second node runs, the processor 51 executes the computer executable instruction stored in the memory 52, so that the second node performs the parallel data transmission method shown in FIG. 3 to FIG. 7. For the specific parallel data transmission method, refer to related description in the embodiment shown in any one of FIG. 3 to FIG. 6. For brevity sake, the details are not described herein again.

The processor 51 may be a central processing unit (CPU). Alternatively, the processor 51 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor, or the like.

The processor 41 or 51 is a control center of the first node or the second node. The processor 41 or 51 performs various functions of the first node or the second node by processing data received by the communications interface 42 or 52 and invoking software or a program in the memory 43 or 53.

The communications interface 42 or 52 may be an interface circuit, and may be configured to receive or send a signal in a process of receiving or sending information or a request. After the communications interface 42 or 52 receives information sent by an external device, the processor 41 or 51 processes the information. In addition, the communications interface 42 or 52 may communicate with a network and another device through wireless communications.

The memory 43 or 53 may include a volatile memory, for example, a random access memory (RAM). The memory 43 or 53 may further include a nonvolatile memory, for example, a read-only memory (ROM), a flash memory, a hard disk drive (HDD), or a solid-state drive (SSD). The memory 43 or 53 may further include a combination of the foregoing types of memories. The processor 41 or 51 may run a software program stored in the memory 43 or 53, so as to execute various functions and applications of the first node or the second node and process data.

The bus 44 or 54 may include a data bus, a power bus, a control bus, a signal status bus, and the like. In this embodiment, for clear description, various buses in FIG. 15 and FIG. 16 are represented by a line.

In conclusion, this embodiment of the present disclosure provides the first node and the second node. The first node in the first BSS generates the PPDU. The PPDU carries the indication information. The indication information is used to indicate whether the second node in the second BSS is allowed to perform parallel data transmission by spanning the time length of the PPDU and indicate the boundary crossing time length of the parallel data transmission. The first node belongs to the first basic service set BSS, and the second node belongs to the second BSS. Further, the first node sends the PPDU, so that the second node can determine, based on the indication information, whether to perform parallel transmission across a boundary of the PPDU, and determine a boundary crossing time length of the parallel transmission. Therefore, the problem where a primary link changes and parallel transmission on a secondary link causes interference to data transmission on the changed primary link is avoided. In other words, link interference brought by parallel transmission across the boundary of the PPDU can be reduced.

It may be clearly understood by a person skilled in the art that, for the purpose of convenient and brief description, division of the foregoing function modules is taken as an example for illustration. In actual application, the foregoing functions can be allocated to different function modules and implemented based on a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A parallel data transmission method, comprising:
   generating, by a first node, a physical protocol data unit (PPDU), wherein the PPDU carries indication information, the indication information is used to indicate whether a second node is allowed to perform parallel data transmission by spanning a time length of the PPDU and indicate a boundary crossing time length of the parallel data transmission, the first node belongs to a first basic service set (BSS), and the second node belongs to a second BSS; and
   sending, by the first node, the PPDU, wherein if the first node is an access point (AP) in the first BSS, the sending, by the first node, the PPDU comprises:
   sending, by the AP, the PPDU to a station in the first BSS, wherein a high efficiency signal field or a Medium Access Control (MAC) frame of the PPDU carries the indication information.

2. The method according to claim 1, wherein
   in the indication information, two bits are used to indicate whether the second node is allowed to perform parallel data transmission by spanning the time length of the PPDU and indicate the boundary crossing time length of the parallel data transmission; or
   in the indication information, one bit is used to indicate whether the second node is allowed to perform parallel data transmission by spanning the time length of the PPDU; and if the second node is allowed to perform parallel data transmission by spanning the time length of the PPDU, two bits are used to indicate the boundary crossing time length of the parallel data transmission in the indication information.

3. The method according to claim 1, wherein
   in the indication information, M bits are respectively used to indicate whether the second node is allowed to perform parallel data transmission in M time periods in a transmission opportunity (TXOP) time length, wherein M≥1; or
   in the indication information, N bits are respectively used to indicate whether the second node is allowed to perform parallel data transmission in N time lengths of the PPDU, wherein N≥1.

4. The method according to claim 1, wherein if the first node is a station in the first BSS, the generating, by a first node, a PPDU comprises:
   receiving, by the station, indication information sent by an AP in the first BSS, wherein the indication information is used to indicate whether the second node is allowed to perform parallel data transmission by spanning the time length of the PPDU and indicate the boundary crossing time length of the parallel data transmission; and
   generating, by the station, a PPDU, wherein the PPDU carries the indication information.

5. The method according to claim 1, wherein if the first node is a station in the first BSS, the generating, by a first node, a PPDU comprises:
   receiving, by the station, an indication parameter sent by an AP in the first BSS, wherein the indication parameter is used to indicate whether the AP allows the second node to perform parallel data transmission by spanning the time length of the PPDU and indicate the boundary crossing time length of the parallel data transmission;
   generating, by the station, indication information based on the time length of the PPDU, a TXOP time length, and the indication parameter, wherein the indication information is used to indicate whether the station allows the second node to perform parallel data transmission by spanning the time length of the PPDU and indicate the boundary crossing time length of the parallel data transmission; and
   generating, by the station, a PPDU, wherein the PPDU carries the indication information.

6. A parallel data transmission method, comprising:
   obtaining, by a second node, a physical protocol data unit (PPDU) sent by a first node, wherein the PPDU carries indication information, the indication information is used to indicate whether the second node is allowed to perform parallel data transmission by spanning a time length of the PPDU and indicate a boundary crossing time length of the parallel data transmission, the first node belongs to a first basic service set (BSS), and the second node belongs to a second BSS; and
   if the indication information indicates that the second node is not allowed to perform parallel data transmission by spanning the time length of the PPDU, performing, by the second node, parallel data transmission in the time length of the PPDU; or
   if the indication information indicates that the second node is allowed to perform parallel data transmission by spanning the time length of the PPDU, performing, by the second node, parallel data transmission in the boundary crossing time length,
   wherein the first node is an AP or a station in the first BSS; and
   the obtaining, by a second node, a PPDU sent by a first node comprises:
   obtaining, by the second node, a PPDU sent by the AP, wherein the PPDU sent by the AP carries first indication information, the first indication information is used to indicate whether the AP allows the second node to perform parallel data transmission by spanning a time length of the PPDU and indicate a boundary crossing time length of the parallel data transmission; or
   obtaining, by the second node, a PPDU sent by the station, wherein the PPDU sent by the station carries second indication information, the second indication information is used to indicate whether the station allows the second node to perform parallel data transmission by spanning a time length of the PPDU and indicate a boundary crossing time length of the parallel data transmission; and
   selecting, by the second node, the first indication information or the second indication information as the indication information; or using, by the second node, the first indication information as the indication information.

7. The method according to claim 6, wherein the selecting, by the second node, the first indication information or the second indication information as the indication information comprises:
comparing, by the second node, the boundary crossing time length indicated by the first indication information with the boundary crossing time length indicated by the second indication information; and
using, by the second node, the first indication information or the second indication information with a shorter boundary crossing time length as the indication information.

8. A first node, comprising:
a processor, configured to generate a physical protocol data unit (PPDU), wherein the PPDU carries indication information, the indication information is used to indicate whether a second node is allowed to perform parallel data transmission by spanning a time length of the PPDU and indicate a boundary crossing time length of the parallel data transmission, the first node belongs to a first basic service set (BSS), and the second node belongs to a second BSS; and
a communications interface, configured to send the PPDU, wherein if the first node is an access point (AP) in the first BSS,
the communications interface is specifically configured to send the PPDU to a station in the first BSS, wherein a high efficiency signal field or a Medium Access Control (MAC) frame of the PPDU carriers the indication information.

9. The first node according to claim 8, wherein in the indication information, two bits are used to indicate whether the second node is allowed to perform parallel data transmission by spanning the time length of the PPDU and indicate the boundary crossing time length of the parallel data transmission; or in the indication information, one bit is used to indicate whether the second node is allowed to perform parallel data transmission by spanning the time length of the PPDU; and if the second node is allowed to perform parallel data transmission by spanning the time length of the PPDU, two bits are used to indicate the boundary crossing time length of the parallel data transmission in the indication information.

10. The first node according to claim 8, wherein in the indication information, M bits are respectively used to indicate whether the second node is allowed to perform parallel data transmission in M time periods in a transmission opportunity (TXOP) time length, wherein M≥1; or in the indication information, N bits are respectively used to indicate whether the second node is allowed to perform parallel data transmission in N time lengths of the PPDU, wherein N≥1.

11. The first node according to claim 8, wherein if the first node is a station in the first BSS,
the communications interface is further configured to receive indication information sent by an AP in the first BSS, and the indication information is used to indicate whether the second node is allowed to perform parallel data transmission by spanning the time length of the PPDU and indicate the boundary crossing time length of the parallel data transmission; and
the processor is specifically configured to generate a PPDU, wherein the PPDU carries the indication information.

12. The first node according to claim 8, wherein if the first node is a station in the first BSS,
the communications interface is further configured to receive an indication parameter sent by an AP in the first BSS, wherein the indication parameter is used to indicate whether the AP allows the second node to perform parallel data transmission by spanning the time length of the PPDU and indicate the boundary crossing time length of the parallel data transmission; and
the processor is specifically configured to: generate indication information based on the time length of the PPDU, a TXOP time length, and the indication parameter, wherein the indication information is used to indicate whether the station allows the second node to perform parallel data transmission by spanning the time length of the PPDU and indicate the boundary crossing time length of the parallel data transmission; and generate a PPDU, wherein the PPDU carries the indication information.

* * * * *